United States Patent [19]
Kaneda

[11] Patent Number: 5,973,857
[45] Date of Patent: *Oct. 26, 1999

[54] PHOTO-TAKING LENS AND OPTICAL APPARATUS

[75] Inventor: Naoya Kaneda, Chigasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,589

[22] Filed: Mar. 5, 1997

[30] Foreign Application Priority Data

Mar. 8, 1996 [JP] Japan .................................. 8-080962

[51] Int. Cl.$^6$ .................................................. G02B 15/14
[52] U.S. Cl. ............................................................ 359/701
[58] Field of Search ..................................... 359/696, 697, 359/698, 701, 823

[56] References Cited

U.S. PATENT DOCUMENTS

| | | | |
|---|---|---|---|
| 4,864,344 | 9/1989 | Arakawa et al. | 354/400 |
| 4,925,282 | 5/1990 | Kanno et al. | 359/698 |
| 5,526,188 | 6/1996 | Kanno et al. | 359/698 |
| 5,576,894 | 11/1996 | Kuwana et al. | 359/701 |

*Primary Examiner*—Georgia Epps
*Assistant Examiner*—Ricky Mack
*Attorney, Agent, or Firm*—Robin, Blecker & Daley

[57] ABSTRACT

A zoom lens in which a lens group is driven in response to an operation member provided on a body to which the zoom lens is attached, includes a rotary manual ring disposed on a lens barrel, and a driving part arranged to drive the lens group in accordance with a rotating state of the manual ring.

14 Claims, 20 Drawing Sheets

PHOTO-TAKING LENS AND OPTICAL APPARATUS

BACKGROUND OF THE INVENTION

1. Field of the Invention

This invention relates to a photo-taking lens and an optical apparatus, and more particularly to a zoom lens and an optical apparatus adapted for a video camera, a still camera, a surveillance camera, or the like.

2. Description of Related Art

Zoom lens optical systems adapted for optical apparatuses of the above-stated kinds have been variously arranged. In the case of the zoom lens optical system shown in FIG. 15, the system has a zoom lens barrel of a type composed of four lens groups in which the fourth lens group disposed rearmost in the zoom lens barrel is used for focusing. The zoom lens barrels of this type are most popularly used in the field of video cameras.

Referring to FIG. 15, the four component lens groups of the zoom lens barrel include a fixed front lens group 111, a variator lens group 112, a fixed lens group 113 and a focusing (compensator) lens group 114. A guide rod 133 is arranged to prevent turning of the variator lens group 112. A feed rod 134 is arranged to feed the variator lens group 112. A fixed lens tube 135 is arranged to support the fixed front lens group 111, the guide rod 133 and the feed rod 134. An iris unit 136 is inserted in the lens barrel (perpendicularly to the paper surface as viewed in the drawing). A stepping motor 137 is arranged to serve as a focusing motor. The stepping motor 137 has an output shaft 138. The output shaft 138 is provided with a male screw 138a formed thereon for moving the focusing lens group 114. The male screw 138a is in mesh with a female screw part 139 which is formed integrally with a moving frame 140 of the focusing lens group 114.

Guide rods 141 and 142 are arranged to guide the focusing lens group 114. A rear plate 143 is arranged to position and retain in place the guide rods 141 and 142. The zoom lens barrel further includes a relay holder 144, a zoom motor 145, a reduction gear unit 146 for the zoom motor 145, and interlocking gears 147 and 148. The interlocking gear 148 is secured to the feed rod 134 which is provided for the variator lens group 112.

The zoom lens barrel operates as follows. When the stepping motor 137 acts to drive, the focusing lens group 114 is moved by screw feeding in the direction of an optical axis. When the zoom motor 145 acts to drive, the feed rod 134 is caused to rotate through the interlocking gears 147 and 148. The rotation of the feed rod 134 causes the variator lens group 112 to be moved also in the direction of the optical axis by a lens frame 112a which is screw-coupled with the feed rod 134.

FIG. 16 shows positional relations obtained in the above-stated zoom lens barrel between the variator lens group and the focusing lens group at some of different object distances. This drawing shows, by way of example, the positional relations obtained in focusing at object distances including an infinity distance, 2 m, 1 m, 80 cm and 0 cm. In a case where the zoom lens barrel is of an inner-focus type, the positional relation between the variator lens group and the focusing lens group varies with the object distance. Therefore, unlike a zoom lens barrel of a front-lens-focus type in which lens groups are moved by a mechanical arrangement such as a cam ring, a defocused state would result from a mere driving action of the zoom motor 145 alone in the case of the zoom lens barrel which is arranged as shown in FIG. 15.

To solve this problem, the positional relation between the variator lens group and the focusing lens group as shown in FIG. 16 must be controlled to optimize it according to the object distance. As such a control, for example, in Japanese Laid-Open Patent Application No. HEI 1-280709 and Japanese Laid-Open Patent Application No. HEI 1-321416, there is disclosed a method for tracing the locus of the positional relation between a variator lens group and a focusing lens group which varies with the object distance.

FIG. 17 shows in a block diagram an arrangement for carrying out the above-stated locus tracing method. Lens groups 111 to 114 are the same lens groups shown in FIG. 15. The position of the variator lens group 112 is detected by a zoom encoder 149. The zoom encoder 149 may be, for example, a volume encoder having a brush mounted on a variator moving ring in one body therewith and arranged to slide over a circuit board having a printed resistance pattern.

An iris encoder 150 is arranged to detect an aperture value of the iris unit 136 by using, for example, the output of a Hall element 163 disposed within an iris meter. An image sensor 151 is composed of a CCD or the like. A camera signal processing circuit 152 is arranged to output a Y signal, which is supplied to an AF circuit 153. Upon receipt of the Y signal, the AF circuit 153 makes a discrimination between an in-focus state and a defocused state. In the event of a defocused state, the AF circuit 153 checks it to find if it is a front-focus state or a rear-focus state and also to find a defocused degree. The results of the checks are sent to a CPU 154.

A power-on reset circuit 155 is arranged to be used in performing various resetting action when a power supply is turned on. A zoom operation circuit 156 is arranged to supply the CPU 154 with information on the details of an operation performed on a zoom switch 157 when the zoom switch 157 is operated by the operator. Memory parts 158, 159 and 160 are arranged to store data relative to loci which correspond to different object distances as shown in FIG. 16. The memory part 158 stores direction data. The memory part 159 stores speed data. The memory part 160 stores boundary data.

A zoom motor driver 161 is arranged to drive the zoom motor 145. A stepping motor driver 162 is arranged to drive the stepping motor 137 by applying input pulses to the stepping motor 137. The number of input pulses applied to the stepping motor 137 is continuously counted by the CPU 154. The count number thus obtained is used as an encoder for the absolute position of the focusing lens group 114.

With the zoom lens barrel arranged in this manner, the position of the variator lens group 112 and that of the focusing lens group 114 are determined respectively by the zoom encoder 149 and the number of input pulses applied to the stepping motor 137 so as to decide one point on a map shown in FIG. 16.

The map shown in FIG. 16 is divided by means of the boundary data 160 into small rectangular areas I, II, III, —as shown in FIG. 18. In FIG. 18, hatched parts represent inhibiting areas where the lens groups 112 and 114 cannot be set. With one point decided as described above, it is possible to detect in which of the small areas the point is located.

The speed data part 159 and the direction data part 158 respectively store the speed and the direction of rotation of the stepping motor 137 obtained from a locus passing the center of each of these areas. In the case of FIG. 18, for example, an abscissa axis which indicates the positions of the variator lens group 112 is divided into 10 zones. Assuming that the speed of the zoom motor 145 is set to move the variator lens group 112 from a telephoto end position to a wide-angle end position in 10 seconds, the variator lens group 112 passes each of these number in one second.

Referring to FIG. 19 which shows the area III of FIG. 18 in an enlarged state, a locus 164 passes through a middle part of the area III. A locus 165 passes through a lower left part of the area III. A locus 166 passes through an upper right part of the same area. These loci have inclinations which differ a little from each other. The illustration indicates that the middle focus 164 can be accurately traced without much error if the focusing lens group is caused to move at a speed of xmm/second.

Assuming that the speed obtained in this manner is called an area representative speed, the speed data memory part 159 stores, for each area, as many values of the area representative speed as the number of the small areas. With this area representative speed assumed to be indicated by an arrow 168, the speed of the stepping motor 137 is set by finely adjusting the area representative speed as indicated by arrows 167 and 169 on the basis of detection results obtained by an automatic focus adjusting device. As for the direction data memory part 158, since the rotating direction of the stepping motor 137 varies according to the area even in the case of zooming from the telephoto end position to the wide-angle end position and vice versa, sign data is also stored in this memory part 158.

As mentioned above, the speed of the stepping motor 137 is obtained by correcting the area representative speed which is obtained according to the position of the variator lens group 112 and that of the focusing lens group 114 and by further correcting the area representative speed according to the result of detection made by the automatic focus adjusting device. With this speed used for controlling the position of the focusing lens group by driving the stepping motor 137 while the zoom motor 145 is in process of driving, even the zoom lens of the inner-focus type can be adequately kept in focus even during the process of zooming.

According to another method, three speeds including speeds indicated by the arrows 167 and 169 in FIG. 19 in addition to the above-stated area representative speed indicated by the arrow 168 are stored for each of the areas and selected according to the result of detection made by the automatic focus adjusting device.

Other methods hitherto employed include a method whereby a locus passing through a point decided on the map from the current positions of the variator lens group and the focusing lens group is computed and is used to be traced, and another method whereby a plurality of loci are stored beforehand as positions of the focusing lens group according to positions of the variator lens group.

In the case of Japanese Laid-Open Patent Applications No. HEI 1-321416, positions of the focusing lens group for a plurality of positions of the variator lens group between the wide-angle end position and the telephoto end position are stored beforehand. At the commencement of zooming, a point on the map determined by the current position of the variator lens group and that of the focusing lens group is detected. Then, an interpolating computing operation is carried out using stored data of points located nearest to the detected point on front-focus and rear-focus sides. After the interpolating operation, the position of the focusing lens group is computed for each focal length (position of the variator lens group).

FIG. 20 shows a locus of the positions of the focusing lens group obtained in the neighborhood of the telephoto end of a zooming range. According to the disclosure of the Japanese Laid-Open Patent Application No. HEI 1-321416, information on the data stored includes focusing lens group positions rr1, rr4, rr7 and rr9 which are represented by a locus LL1 for the variator lens group positions Vn (telephoto end position), Vn-1, Vn-2 and Vn-3. In other words, a locus passing through points P1, P4, P7 and P10 of the map is stored as an ∞ locus.

The stored data also includes, for the variator lens group positions Vn (telephoto end), Vn-1, Vn-2 and Vn-3, information on the focusing lens group positions rr2, rr5, rr8 and rr10 which are represented by a locus LL2 and stored, for example, as a focusing locus for 10 m. Data is of course prepared in this manner to cover the whole zooming range from the telephoto end to the wide-angle end.

In zooming from the position (Vn, rr), i.e., a point P within the map, points PA, PB and PC are obtained by an interpolating computing operation on the basis of the data stored for a variator lens group position nearest on the front (near) focus side, i.e., the data of the locus LL2 and the data stored for a variator lens group position nearest on the rear (far) focus side, i.e., the data of the locus LL1. The focusing lens positions are obtained for focal length positions V0 (wide-angle end), V1, V2, —Vn-1, Vn (telephoto end) to determine a locus during process of zooming.

Since the points PA, PB and PC are obtained by the interpolating computing operation, a ratio of a distance between the points P1 and P to a distance between the points P2 and P becomes, for example, equal to a ratio of a distance between the points PA and P4 to a distance between the points PA to P5.

A memory relative to speeds or a memory relative to positions is thus prepared of course on the basis of optical design values on the assumption that the lens barrel is manufactured with no manufacturing error.

Each of embodiments of this invention which will be described later herein is an inner-focus type zoom lens composed of four lens groups of positive-negative-positive-positive refractive power arrangement like the lens barrel of the prior art described by way of example above. In the lens group arrangement, the second lens group is a variator lens group and the fourth lens group is a focusing lens group. However, this invention is applicable also to lens barrels of different arrangements, for example, such as the one disclosed in FIGS. 5, 7 and 8 of Japanese Laid-Open Patent Application No. HEI 3-27011.

In the case of the prior art described above, a DC motor having a gear head is employed as a zoom actuator. However, a stepping motor may be employed like the actuator of the focusing lens group (the fourth lens group). In that case, the absolute position of the variator lens group (the second lens group) is preferably detected by means of counting the number of input pulses indicating a reference reset position in the same manner as the means employed for the focusing lens group, instead of the use of a volume encoder mentioned in the foregoing.

In the prior art example described above, the zooming intention of the operator is imparted by an operation on the zoom switch 157 shown in FIG. 17. In a case where a zooming speed is to be changed, the speed may be changed by detecting, for example, an amount to which the zoom switch 157 is pushed (pushing amount).

In most cases, a zoom switch, such as the above-stated one, is preferably disposed within an easy reach of an operating finger. Therefore, in the case of a relatively compact video camera adapted for use by general consumers, the zoom switch is disposed on the side of the camera body, for example, as shown in FIG. 21.

If a zooming operation is to be controlled solely by means of the zoom switch 157, the variator lens group (the second lens group) cannot be moved directly by the operator. Therefore, in the case of the optical system described above, the CPU 154 must be arranged to act to control the second and fourth lens groups in such a way as to cause the fourth lens group to move adequately in relation to the movement of the second lens group.

In order to have the variator lens group not moved directly by the operator, on the other hand, there is a limit in respect of the zooming speed. In a case where a stepping motor is used as the second lens group driving means (the zoom motor) 145 while a stepping motor is also used for the fourth lens group driving means (focusing motor) 137, at least a period of time of 2 to 3 seconds has been necessary in general in moving the lens groups from the telephoto end to the wide-angle end, depending on the magnifying rate of zooming, the characteristic of each of the motors, a lead pitch, etc.

The zooming operation of the inner-focus type zoom lens composed of four lens groups and generally employed at present is as described above.

A front-lens focusing type zoom lens which is arranged to use the first lens group for focusing is next described. FIG. 22 shows a manner generally employed in arranging a front-lens focusing type zoom lens.

Referring to FIG. 22, the zoom lens is composed of a first lens group 2101 which is a focusing lens group, a variator lens group 2102, a compensator lens group 2103 and a relay lens group 2104. The zooming lens includes a fixed lens tube 2105, a female helicoid tube 2106, a front lens tube 2107, a relay holder 2108, a relay lens tube 2109, an iris blade unit 2110, an iris motor 2111, a zoom motor body 2112, a zoom motor gear head part 2113, a focus motor body 2114, a focus motor gear head part 2115, a focus motor output gear 2117, a gear part 2118 formed integrally with the female helicoid tube 2106, a zoom ring 2119, a gear part 2120 formed on the zoom ring 2119 integrally therewith, a projection 2121 provided for transmitting the rotation of the zoom ring 2119 to a cam ring 2122, the cam ring 2122, a cam groove 2123 provided in the cam ring 2122 for the variator lens group, a cam groove 2124 provided in the cam ring 2122 for the compensator lens group 2103, a variator moving ring 2125, a compensator moving ring 2126, a cam follower part 2127 formed integrally with the variator moving ring 2125, a cam follower part 2128 formed integrally with the compensator moving ring 2126, guide rods 2129 and 2130 which are provided for the moving rings 2125 and 2126, a focus motor slip unit 2131, and a zoom motor slip unit 2132.

During focusing in the front-lens focus type zoom lens, the focusing lens group 2101 is moved in the direction of an optical axis. For this purpose, the focusing lens group 210 (the first lens group) 2101 is secured to the front lens tube 2107. The outside diameter of the front lens tube 2107 is arranged to be fitted into the inner diameter of the female helicoid tube 2106 without play and to be fixed in place with an adhesive after adjusting its position in the direction of the optical axis. The female helicoid tube 2106 engages the fixed lens tube 2105 through its helicoid screw. Therefore, the focusing lens group 2101 can be moved in the direction of the optical axis by rotating the female helicoid tube 2106.

In the case of the front-lens focus type zoom lens, the focusing lens group is arranged in front of the variator lens group (the second lens group) and the compensator lens group (the third lens group). The lens arrangement enables the operator to directly move the variator lens group for zooming at any suitable speed without causing any change in focus.

The operations of zoom lenses of two different types, i.e., the inner focus type and the front-lens focus type, have been described above. The inner focus type generally permits more reduction in size than the front-lens focus type to permit reduction in cost and energy. Further, with regard to the lens barrel mechanism, the front-lens focus type requires use of many parts of complex shapes which makes it difficult to ensure an adequate degree of precision for such parts.

In view of these advantages, a lens barrel of the inner focus type has variously been arranged to increase a maximum lens group moving speed by using a linear actuator for a high speed zooming and also for removal of noises and vibrations caused by a stepping motor. FIGS. 23(A) and 23(B) show one example of such an arrangement. In the case of FIGS. 23(A) and 23(B), a voice coil motor of the moving coil type is employed as the linear actuator. FIG. 23(B) is a longitudinal section taken on a line B—B of FIG. 23(A). Referring to FIGS. 23(A) and 23(B), a yoke 1117a and a coil 1116 which is wound around a bobbin 1119 are arranged on the outer circumferential side of a lens holding frame 1111 which is arranged to hold lenses 1101b1 to 1101b3. To the yoke 1117a is opposed a yoke 1117b which is located outside of the coil 1116. A magnet 1115 is bonded to the yoke 1117b. The yokes 1117a and 1117b and the magnet 1115 are mounted on a fixed tube 1102. The lens holding frame 1111 is carried by two parallel guide rods 1103a and 1103b to be movable in the direction of an optical axis 1105.

The magnet 1115 is magnetized as shown in FIG. 23(B). Therefore, a magnetic field is formed between the yokes 1117a and 1117b in the radial direction. The coil 1116 is located between the yokes 1117a and 1117b and is wound in the circumferential direction. When a current is allowed to flow through the coil 1116, a driving force is generated for driving in the direction of the optical axis. The lens holding frame 1111 and the lens groups 1101b1 to 1101b3 which are arranged integrally with the bobbin 1119 are then driven in the direction of the optical axis. The voice coil type actuator which has been described may be differently arranged in various manners. Further, it is also conceivable to use a motor operating on some different principle, such as an ultrasonic motor.

While various zooming lens arrangements have been described in detail above, there has been known a method of attaining a zooming effect called "electronic zoom". According to the "electronic zoom" method, while the size of an image formed on an image forming plane remains unchanged, an image range to be actually recorded or outputted can be caused to gradually vary on the image forming plane.

The electronic zoom method corresponds to the conventional enlargement photography whereby an image is enlarged by trimming. The electronic zoom method thus has a disadvantage in that the quality of picture deteriorates to a greater degree accordingly as the image position is located closer to the telephoto end (accordingly as the cutting range becomes narrower). The electronic zoom is, therefore, inferior to optical zooming. However, the advancement of various methods for interpolating video signals has come to enable electronic zooming to enlarge images up to about two magnifications in a state acceptable for practical applications.

For example, assuming that a video camera for general consumers, shown in FIG. 21, has a zoom lens of 12 magnifications and an electronic zooming power of two magnifications, a zooming effect of 24 magnifications is obtainable in all. In such a case, when the zoom switch 157 is operated to zoom from the wide-angle end toward the telephoto end, a zooming action is carried out by combining the electronic zoom with the optical zoom after the variator lens group arrives at the telephoto end position of the optical zoom, as shown in FIGS. 8(A) to 8(C).

In FIG. 8(A), the abscissa axis shows a period of time for which the zoom switch 157 is being pushed, while the ordinate axis shows the magnifying rate. After arrival of the variator lens group at the telephoto end position as shown in FIG. 8(B), the electronic zoom comes to cause the magnifying rate to continuously increase. The magnifying rate of the optical zoom varies in a manner as shown in FIG. 8(C).

While FIGS. 8(A) to 8(C) show changes in position on the assumption that all the positional changes linearly take place, the changes do not have to linearly take place. Further, the point of change-over from the optical zoom to the electronic zoom is arranged to be one point at the telephoto end. However, it is conceivable to arrange the optical zoom and the electronic zoom to have some overlapping area.

It is known to arrange a camera to interchange with each other the lenses of the varied kinds described.

FIG. 24 shows in a block diagram the arrangement of a system for interchangeable lenses. In the case shown, a zoom lens which is composed of four lens groups is used. These lens groups are arranged in a manner most popularly employed for a video camera to have refracting powers in the order of positive, positive, positive and positive refracting powers. The zoom lens is, however, not limited to this lens arrangement.

Light from an object comes through a first lens group 111 which is fixed, a variator lens group 112 which is a second lens group arranged to perform a magnification varying action, an iris 136, a third lens group 113 which is fixed and a focusing lens group 114 which is a fourth lens group arranged to perform a focus adjusting function and also a compensating function for correcting any shift of a focal plane resulting from the changes taking place during variation of magnification. The three primary color components, i.e., red, green and blue components, of the light passing through these lens groups are imaged respectively on image sensors 303 to 305 which are composed of CCDs or the like.

The images formed on the image sensors 303, 304 and 305 are photo-electrically converted and amplified to an optimum level by amplifiers 405, 406 and 407. Each of the amplified images is inputted to a camera signal processing circuit 152. The image is then converted into a standard television signal and, at the same time, is read out in the form of data by a microcomputer 409 (camera microcomputer) disposed in a camera body 419 as information on automatic focusing and automatic exposure adjustment.

The information (or data) read out by the camera microcomputer 409 is transmitted together with information on the state of operation switches of varied kinds such as a zoom switch, etc., disposed on the side of the camera body 419 to a lens microcomputer 410 through a contact 307 disposed on the side of the camera body 419 and a contact 318 disposed on the side of a lens unit 418. The lens microcomputer 410 carries out a motor control program on the basis of the information of varied kinds sent from the camera microcomputer 409 for automatic focusing (focus adjustment). The focusing lens group 114 is moved in the direction of an optical axis for focusing by driving a focus motor 137 through a motor driver 162.

Further, in a case where information on the state of the zoom switch sent from the camera microcomputer 409 calls for an action to keep a focal plane in place while zooming is in process, the lens microcomputer 410 carries out the focal plane keeping action by giving signals to a zoom motor driver 161 and the focus motor driver 162 on the basis of data of positions which is stored within the lens microcomputer 410 as data necessary for maintaining an in-focus state according to each of various object distances.

In accordance with the signals from the lens microcomputer 410, the zoom motor driver 161 and the focus motor driver 162 respectively drive the zoom motor 145 and the focus motor 137. The variator lens group 112 and the focusing lens group 114 are thus moved in the direction of the optical axis, so that a zooming action can be carried out without changing a focus position.

Further, the lens microcomputer 410 is arranged to give a signal for an apposite exposure to an iris driver 414 on the basis of information on the exposure adjustment coming from the camera microcomputer 409 and information from an encoder 163 which is provided for detecting the aperture state of the iris 136. Then, in accordance with the signal from the lens microcomputer 410, the iris driver 414 drives an actuator 413 to stop down the aperture of the iris 136 for an apposite exposure.

The contacts 307 and 318 are arranged both on the camera body side and on the lens side to be detachably interconnected to permit communication between the camera microcomputer 409 and the lens microcomputer 410. The lens unit 418 thus can be detachably mounted on the camera body 419. The arrangement enables the camera to carry out all actions for automatic focusing, automatic exposure adjustment and zooming without any problem in the same manner as an ordinary video camera for which a lens and a camera body are arranged in one body.

In the camera system of such an interchangeable lens type, a communication route is formed through the contact of the contacts provided for the lens and camera microcomputers 410 and 409. The details of this are as shown in FIGS. 25 and 26. FIG. 25 shows in a sectional view the lens barrel in a state of being mounted on the side of the camera shown as an optical apparatus. FIG. 26 shows an end face of the lens barrel as viewed before it is mounted on the camera. The camera is assumed to be a so-called 3 CCD video camera arranged to have three prisms for obtaining an image by color-separating the image into three colors of R (red), Green (G) and blue (B). However, the camera may be of some other different type.

The camera is provided with a color separation prism 302, a base member 301 which is arranged to carry the color separation prism 302, and a mount member 306 (which is assumed to be a bayonet mount in this case but may be some other tightening mount) for interchangeable lenses. The camera is provided also with the CCDs 303, 304 and 305 and the electrical contact 307. The electrical contact 307 is arranged to permit communication between the camera microcomputer 409 and the lens microcomputer 410 for automatic-focusing and automatic-iris-control functions.

On the side of the lens unit 418, four movable lens groups 311 to 314 are arranged in the rearmost part of the lens unit 418. These lens groups are movable in the direction of the optical axis and are integrally secured to a moving tube 315. The moving tube 315 has a sleeve part 316 and is arranged to be movable in the direction of the optical axis, for example, with the sleeve part 316 being positioned by a metal pole member 400. Although they are not shown, various actuators described by way of example in the foregoing description of the conventional arrangement example are arranged to move the lens groups in the direction of the optical axis.

The movable lens groups 311 to 314 are arranged within a fixed tube which is not shown. A mount part 308 is arranged at the rear end of the fixed tube to form a bayonet mount on the lens side. Further, the mount part 308 is arranged to have the lens correctly positioned in mounting it in conjunction with the mount part 306 which is disposed on the side of the camera body 419. A contact 318 is arranged on the lens side to be in contact with the contact 307 of the camera body for communication between the lens unit 418 and the camera body 419 when the lens unit 418 is mounted on the camera body 419.

A glass holder 309 having a flat glass plate 310 is secured from behind to the lens side mount part 308 by means of a claw part 317. When the lens unit 418 is removed from the camera body 419, the operator may touch the flat glass plate 310 but the movable lens groups are effectively prevented from being touched by the operator.

A zooming action of an inner-focus type zoom lens, a zooming action of a front-lens focusing type zoom lens, an electronic zoom action, and a method for interlocking the optical zoom with the electronic zoom, an interchangeable lens system, and the arrangement of contact parts for mounting an interchangeable lens, in an optical apparatus such as a video camera, a still camera, a surveillance camera or the like, have been described in detail above.

According to the arrangement of the inner focus type zoom lens described above, it is hardly possible with the zoom switch 157 shown in FIG. 21 to finely and quickly set the angle of view even if the lens is arranged to permit zooming at a high speed. Therefore, it has been desired to arrange the inner focus type zoom lens to permit a zooming operation by rotating a ring around the optical axis of the lens in the same manner as in the case of the front-lens focusing type zoom lens.

Further, in the case of an interchangeable lens system having the electronic zoom function on the side of the camera body, the lens has presented the following problem.

A method for zooming, particularly, a method for interlocking the electronic zoom with the optical zoom, when (i) a photo-taking lens of the kind enabling the operator to directly move the variator lens group or (ii) a photo-taking lens of a kind other than the kind (i) is mounted on the camera, has not been clearly disclosed. As a result, the second lens group (the variator lens group) of the lens might be moved toward the wide-angle end while the electronic zoom still remains in an on-state. Under such a condition, a shooting operation would be carried on with the electronic zoom left in the on-state, which deteriorates the picture quality, although the shooting could be carried on to obtain a better picture quality at the same angle of view by using some other combination of the magnifying rate of the optical zoom and the magnifying rate of the electronic zoom.

BRIEF SUMMARY OF THE INVENTION

This invention is directed to the solution of the problems of the prior art described. It is an object of this invention to provide an improvement on a zoom lens, a camera system or an optical apparatus.

In accordance with one aspect of this invention, there is provided a zoom lens in which a lens group is driven in response to an operation member provided on a body to which the zoom lens is attached, the zoom lens comprising a rotary manual ring disposed on a lens barrel, and driving means for driving the lens group in accordance with a rotating state of the manual ring.

In accordance with one aspect of this invention, there is provided a camera system in which a lens group (having at least one lens) is driven in response to an operation member provided on a camera body, the camera system comprising a rotary manual ring disposed on a lens barrel, and driving means for driving the lens group in accordance with a rotating state of the manual ring.

Further, in accordance with one aspect of this invention, there is provided an optical apparatus having the above-stated zoom lens.

In accordance with a preferred embodiment of this invention, the above-stated driving means includes detecting means for detecting a rotation speed of the manual ring and varies a moving speed of the lens group in accordance with the rotation speed detected by the detecting means. Further, the zoom lens is an interchangeable lens which is detachably mountable on the body. Further, the lens group of the zoom lens includes a variator lens group and a compensator lens group which is disposed nearer to an image side than the variator lens group.

Further, electronic zooming on a photographed image is performed in response to the operation member provided on the body.

In accordance with this invention, an optical apparatus of the kind having a photo-taking lens which includes optical zoom means and is detachably mountable on a camera body which includes electronic zoom means is arranged to be capable of giving a natural feeling of zooming operation and an adequate image with a magnification varying action adequately performed as a whole.

The above and other objects and features of this invention will become apparent from the following detailed description of preferred embodiments thereof taken in connection with the accompanying drawings.

DETAILED DESCRIPTION OF THE INVENTION

Figure 1:
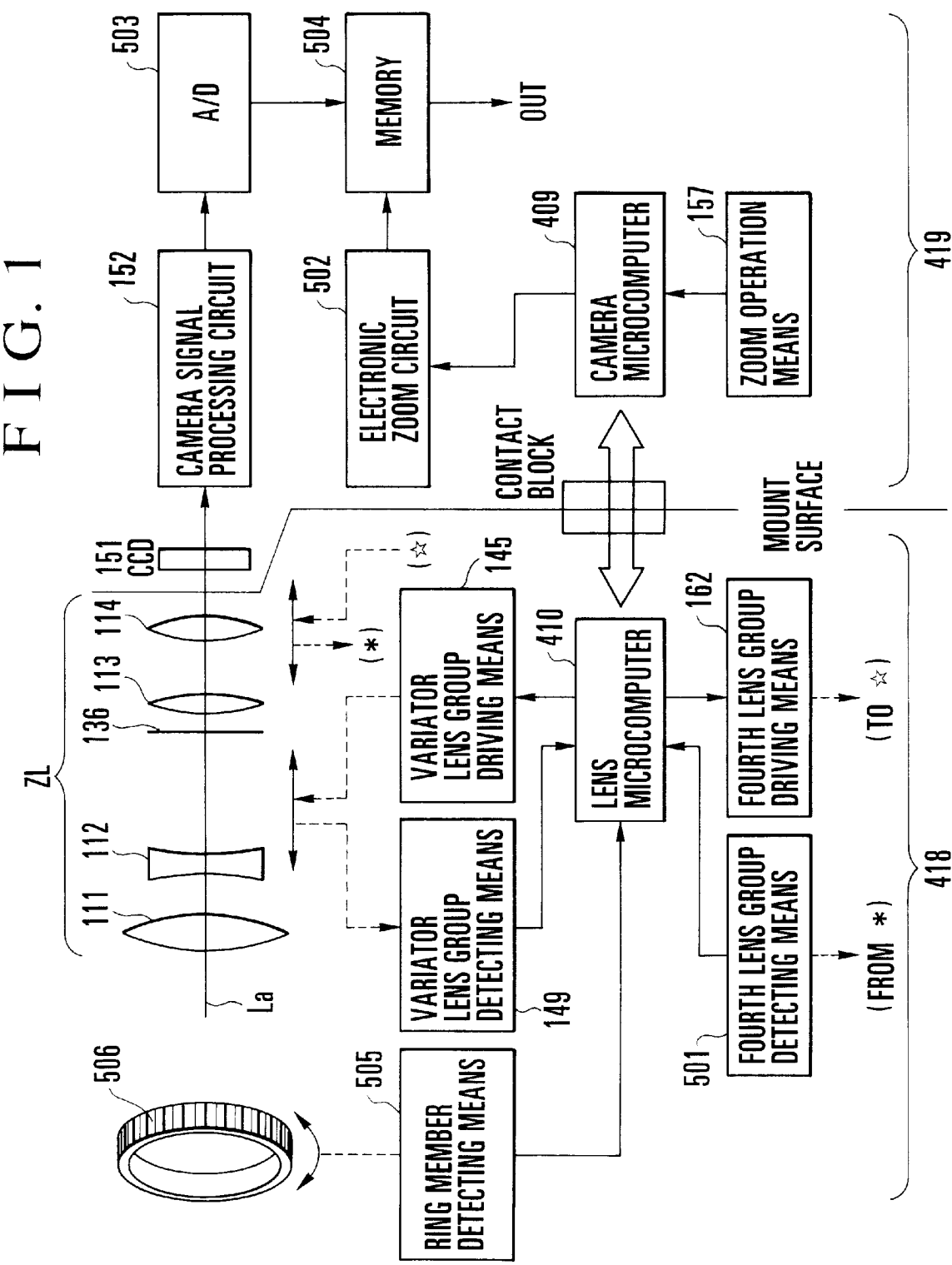
FIG. 1 is a block diagram showing the essential parts of a first embodiment of this invention.

FIG. 1 is a block diagram showing essential parts of a first embodiment of this invention. Referring to FIG. 1, a photo-taking lens 418 is detachably mounted on a camera body 419 through a mount surface.

A zoom lens ZL, which is of the so-called rear focus type, is composed of a first lens group 111 which is fixed and has a positive refractive power, a second lens group (a variator lens group) 112 which has a negative refractive power and is arranged to move for varying magnification, an iris 136, a third lens group 113 which is fixed and has a positive refractive power, and a fourth lens group 114 (a focusing lens group acting also as a compensator) which has a positive refractive power and is arranged to move back and forth in the direction of an optical axis so as to correct changes of an image plane resulting from changes taking place in magnification and to perform focusing.

The first embodiment is arranged to perform zooming, i.e., a magnification varying action, by moving a magnification varying system (the lens groups 112 and 114) of a photo-taking lens (the zoom lens) back and forth along the optical axis in response to a rotating operation performed on a manual zoom ring 506 (an MZ ring or a ring member) called an "electronic ring".

The ring member 506, which may be called the electronic ring or the electronic zoom ring, is arranged to be endlessly rotatable approximately on the optical axis La of the zoom lens ZL. A zooming operation is performed by the operator by turning the ring member 506. For the zooming operation, a non-slip part, a knurled part, a rubber member or the like is provided along the periphery of the ring member 506. Ring member detecting means 505 is arranged to give information on the rotation of the ring member 506.

Variator lens group detecting means 149 (a zoom encoder) is arranged to detect the position of the variator lens group 112 in the direction of the optical axis for obtaining the zoom position of the zoom lens ZL. Variator lens group driving means (a zoom motor) 145 is arranged to drive the variator lens group 112.

Fourth lens group detecting means (a focus encoder) 501 is arranged to detect the position of the fourth lens group 114 in the direction of the optical axis for obtaining a focusing distance (a distance to a shooting object) of the zoom lens ZL. Fourth lens group driving means (a focus motor) 162 is arranged to drive the fourth lens group 114.

The above-stated elements 149, 145, 501, 162, etc., jointly form optical zoom means.

A lens microcomputer 410 (lens control means or a CPU for the lens) is arranged to control various driving actions of the zoom lens ZL.

In a case where stepping motors are employed as the variator lens group driving means 145 and the fourth lens group driving means 162, the variator lens group detecting means 149 and the fourth lens group detecting means 501 may be arranged to count pulses inputted, counting from datum reset positions. In that case, a position sensor (a datum position sensor) is used for detecting the datum position. The position sensor is preferably a photo-sensor which is composed of a photo-interrupter and a light blocking wall formed integrally with a moving lens group frame, or a magnetic sensor which is composed of a Hall IC and a magnet Mg.

An image sensor 151 is composed of a CCD, etc., and is arranged to have an image of a shooting object coming through the zoom lens ZL formed on its surface. A camera signal processing circuit 152 is arranged to process a signal coming from the image sensor 151. An A/D converter 503 is arranged to convert an analog video signal coming from the camera signal processing circuit 152 into a digital video signal. A memory (storage means) 504 is arranged to store a digital video signal coming from the A/D converter 503. Zoom operation means 157 is arranged to permit the operator to perform zooming either from a wide-angle end position toward a telephoto end position or from the telephoto end position toward the wide-angle end position. A camera microcomputer 409 (a microcomputer of the camera body or a CPU for the camera) is arranged to control the electronic-zoom and optical-zoom operations of the camera on the basis of a zooming operation signal from the zoom operation means 157.

An electronic zoom circuit 502 is arranged to process the digital video signal stored in the memory 504 on the basis of a signal (indicating a zoom magnifying rate) coming from the camera microcomputer 409, in such a way as to set an electronic-zoom magnifying rate, for example, through a trimming process, etc.

The above-stated elements 502, 504, etc., jointly form electronic zoom means. The lens microcomputer 410 and the camera microcomputer 409 exchange signals of varied kinds between them through a contact block.

An amount of change resulting from the rotation of the ring member 506, i.e., an amount corresponding to the rotation speed of the ring member 506, such as an amount corresponding to "a rotation angle per unit time" or "a length of time required for rotation by unit rotation angle", is detected by the ring member detecting means 505. Then, on the basis of a signal from the ring member detecting means 505, the lens microcomputer 410 causes the magnification varying system (112 and 114) to move in the direction of the optical axis for varying the magnification of the zoom lens ZL.

At that time, the "length of time required for rotation by unit rotation angle" is obtained by some rotation state detecting means, such as pulse output means which turns on and off every time the ring member 506 rotates to a predetermined angle or a volume encoder which is arranged to continuously vary its output according to the rotation of the ring member 506.

Figure 2:
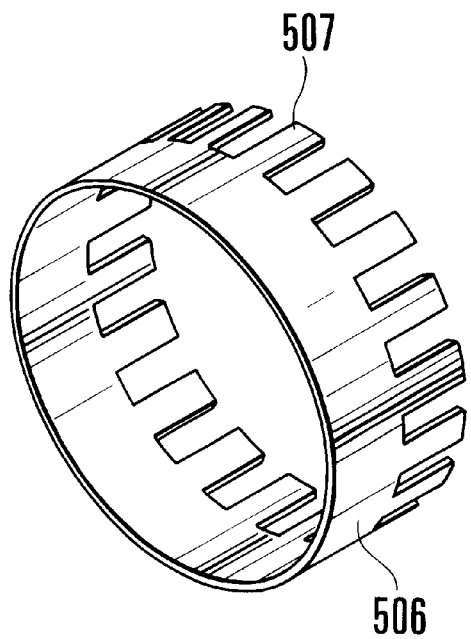
FIG. 2 is a perspective view showing the structure of a ring member in the first embodiment of this invention.

FIG. 2 shows in a perspective view the essential parts of the ring member 506. A comb-shaped part 507 is formed in the rear part of the ring member 506.

Figure 3:
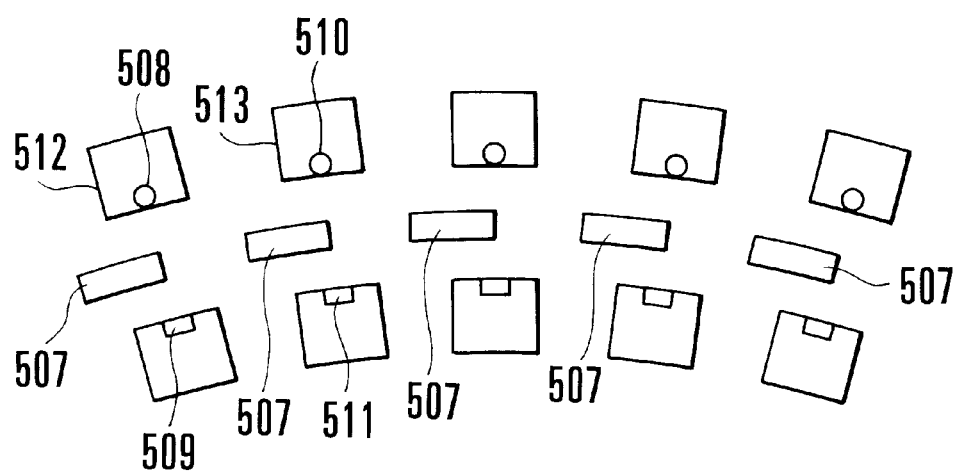
FIG. 3 shows an arrangement for detecting the rotation of the ring member in the first embodiment.

FIG. 3 schematically shows the essential parts of an encoder arranged as the ring member detecting means 505 for detecting information on the rotation of the ring member 506 through the comb-shaped part 507 of the ring member 506. In FIG. 3, the comb-shaped part 507 is shown as viewed from an image forming side in the direction of the optical axis. Referring to FIG. 3, there are provided light emitting elements 508 and 510 which are iREDs or the like. Light receiving elements 509 and 511 are paired respectively with the light emitting elements 508 and 510 across the rotating part of the comb-shaped part 507. Holding parts 512 and 513 are provided for holding these elements.

Figure 4:
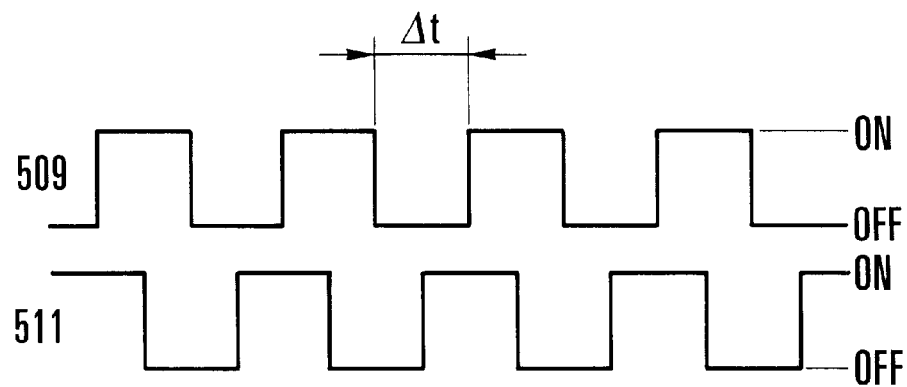
FIG. 4 shows an output indicating the detected rotation of the ring member in the first embodiment.

FIG. 4 shows pulse signals obtained by the light receiving elements 509 and 511 when the ring member 506 is rotated. In the case of the first embodiment, distances in the direction of an arc between the two light emitting elements 508 and 510 and between the two light receiving elements 509 and 511 are set in such a way as to have the phases of the pulse signals obtained by the two light receiving elements 509 and 511 differ 90 degrees from each other.

In the first embodiment, the rotating direction of the ring member 506 is detected by finding whether or not the output signal from one of the two light receiving elements 509 and 511, say, the light receiving element 511, is in an off-state or in an on-state when the other light receiving element 509 turns on from its off-state. The relation of the rotating direction of the ring member 506 to the direction of zooming is set, for example, as follows. Zooming is effected toward the wide-angle end when the ring member 506 turns clockwise and toward the telephoto end when the ring member 506 turns counterclockwise. The zooming direction is thus decided by the rotating direction of the ring member 506.

In the first embodiment, the speed of zooming is arranged to vary according to the rotation speed of the ring member 506. For example, referring to FIG. 4, the zooming speed is varied according to a period of time $\Delta t$ between a point of change from an on-state to an off-state and a point of change from the off-state to the on-state.

Figure 5:
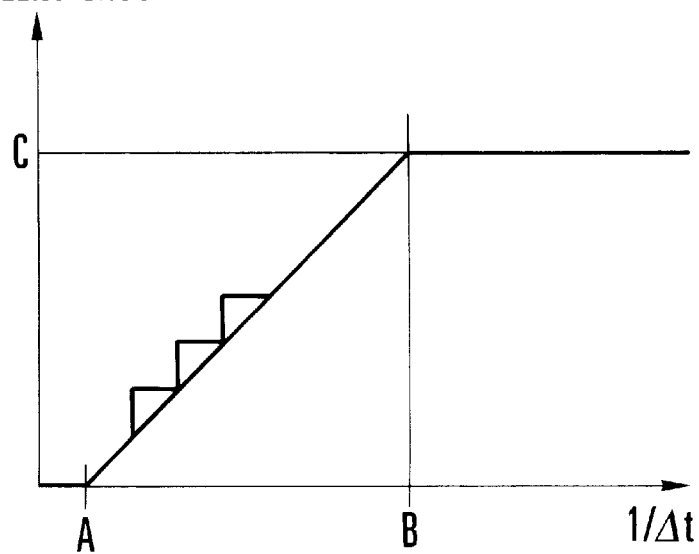
FIG. 5 is a graph showing how a zooming speed is set according to the detection output indicating the rotation of the ring member in the first embodiment.

FIG. 5 shows the relation of the zooming speed to the rotation speed of the ring member 506. Referring to FIG. 5, zooming is not effected when $1/\Delta t < A$. When $A \leq 1/\Delta t \leq B$, the moving speed of the second lens group, i.e., the zooming speed, is varied according to the period of time $\Delta t$. The zooming speed may be changed either in an analog manner or stepwise as shown in FIG. 5. In the first embodiment, the moving speed of the second lens group (zooming speed) never exceeds a maximum speed value C even if the ring member 506 is rotated at a high speed at which the value $1/\Delta t$ exceeds a threshold value B. The speed C is a maximum controllable zooming speed determined according to the various characteristics of a motor for moving the second lens group, the computing speed of the microcomputer, a sampling speed at which the result of detection made by the encoder can be sampled by the microcomputer, etc.

The moving speed of the second lens group is set as shown on the ordinate axis in FIG. 5. In actuality, however, the speed may be set to be variable according to the position of the second lens group (zooming position) in the direction of the optical axis. For example, in varying the magnification from the wide-angle end position toward the telephoto end position, the moving speed of the second lens group may be lowered within a predetermined range including the telephoto end position, as shown in FIG. 7.

Figure 7:
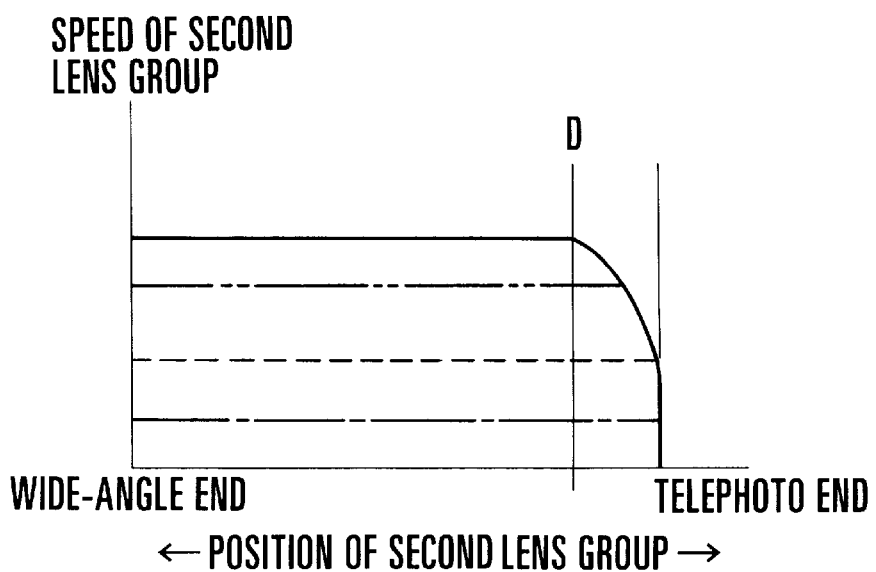
FIG. 7 is a graph showing the moving speed of a variator lens group according to the rotation speed of the ring member in the first embodiment in relation to the position of the variator lens group.

In FIG. 7, the abscissa axis indicates the absolute position of the second lens group (the variator lens group) in the direction of the optical axis and the ordinate axis indicates the moving speed of the second lens group. A full line curve shows a speed obtained at the maximum moving speed C between the wide-angle end W and a zoom position D, with a possible out-of-step state of the stepping motor, etc., taken into consideration. A speed obtained between the zoom position D and the telephoto end position T depends on the capability of the fourth lens group driving means and is decelerated to permit tracking. In the case of FIG. 7, the speed is increased to shorten the period of time $\Delta t$ as shown in the order of a one-dot chain line→a broken line→a two-dot chain line→a full line. By virtue of this setting, the focusing lens group which is the fourth lens group can be driven by the driving means (the focus motor) at an appositely controlled high speed. In order to avoid giving any disagreeable feeling to the operator as much as possible in varying the magnification of the zoom lens through the rotating direction and speed of the ring member 506, in the first embodiment, the zooming time required in zooming from the telephoto end toward the wide-angle end at the speed C in FIG. 5 is arranged to be not greater than one second by using a linear motor, a stepping motor or the like.

The period of time $\Delta t$ shown in FIG. 4 may be arranged to be a difference in time between the edge parts of the two encoders for finer detection. The detecting method may be replaced with some other suitable method.

While a rotation detecting means composed of the comb-shaped part 507 and the photo-interrupters is used for zooming, the rotation detecting means may be replaced with some other suitable means. For example, a method of causing the output shaft of a rotary volume encoder to rotate between the ring member and the encoder may be employed.

Figure 6:
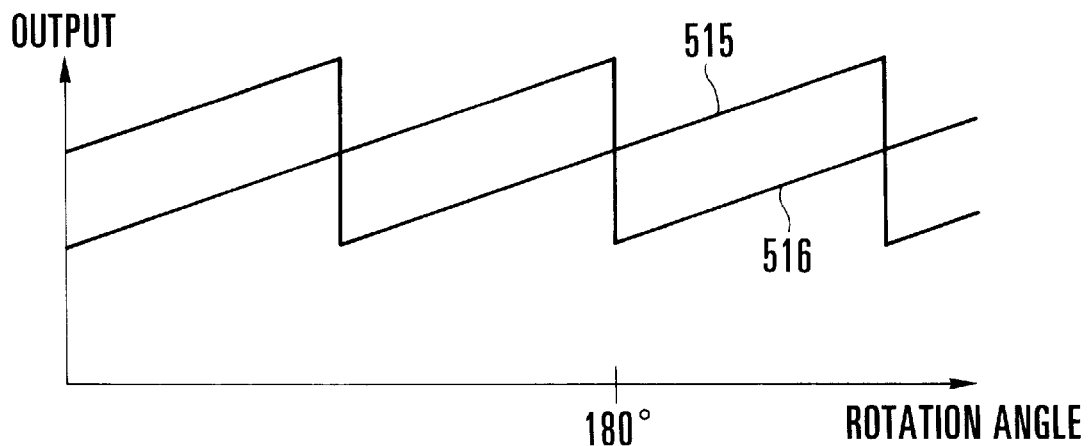
FIG. 6 shows another example of the rotation detection output in the first embodiment.

FIG. 6 shows two detection signals 515 and 516 obtained by using two outputs of the above-stated volume encoder. For example, the zooming speed may be arranged to vary according to the amount of a change taking place in an output value in a predetermined period of time.

The amount of rotation of the ring member 506 is detectable also by other methods of varied kinds such as a magnetic method. Any method may be employed so long as the direction and the speed of rotation of the ring member 506 are detectable by the method.

Further, after the position of the second lens group is caused to reach the telephoto end position by zooming from the wide-angle end position toward the telephoto end position or to reach the wide-angle end position by zooming from the telephoto end position toward the wide-angle end position, each of the lens groups remains in pause. In a case where the camera has the electronic zoom function, the optical zoom and the electronic zoom can be continuously controlled as shown in FIGS. 8(A) to 8(B) according to the state of rotation detected by the rotary encoder.

The term "optical zoom" as used herein means a method for causing the focal length of the whole zoom lens system by moving the lens groups. The term "electronic zoom" means a method for electrically causing the range of actual recording or outputting image to gradually vary on an image forming plane while the size of image on the image forming plane remains unchanged.

For example, assuming that the video camera has a zoom lens of 12 magnifications and an electronic zoom power of two magnifications, a zooming effect of 24 magnifications is obtained in all. In such a case, when the zoom switch (zoom operation means) 157 is operated for zooming from the wide-angle end toward the telephoto end, a zooming action is carried out by combining the electronic zoom with the optical zoom after the telephoto end position of the optical zoom as shown in FIGS. 8(A) to 8(C). In FIG. 8(A), the abscissa axis indicates a period of time for which the zoom switch 157 is being pushed, and the ordinate axis indicates the magnifying rate. After arrival of the variator lens group at the telephoto end position, the electronic zoom comes to function to continuously increase the magnifying rate as shown in FIG. 8(B). The optical magnifying rate varies in a manner as shown in FIG. 8(C).

Figure 8A:
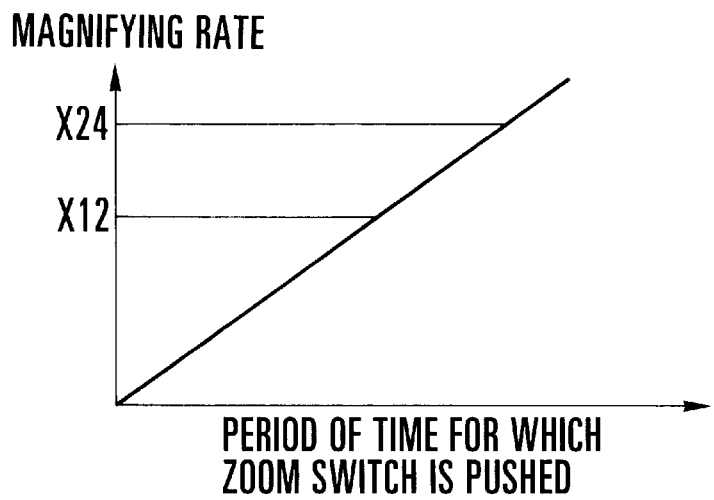
FIGS. 8(A), 8(B) and 8(C) are graphs each showing a relation between a period of time for which the zoom switch is being pushed and the magnifying rate in an ordinary camera.
Figure 8B:
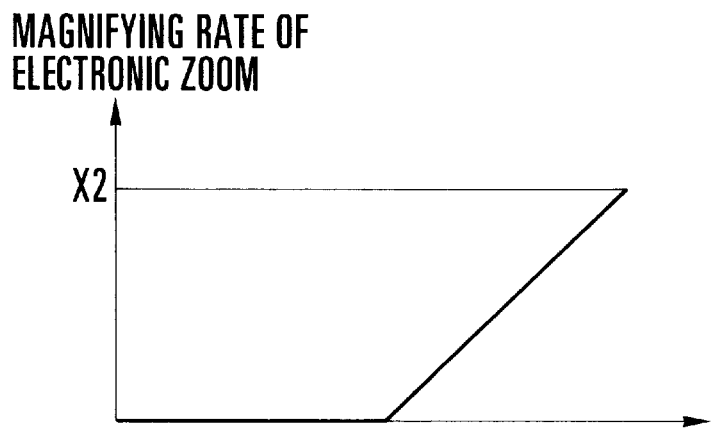
Figure 8C:
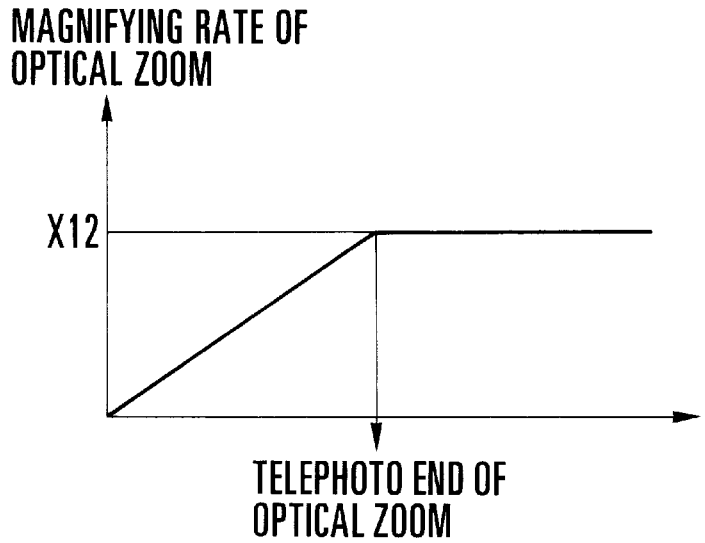

While FIGS. 8(A) to 8(C) show changes of position on the assumption that all changes of position linearly take place, the changes do not have to linearly take place. Further, although the position of change-over from the optical zoom to the electronic zoom is arranged to be one point at the telephoto end, it is conceivable to change the arrangement to have an overlapping area.

Table 1, which appears hereinafter, shows zoom operations in combination with actions of a ring member (an electronic ring or a mechanical ring) provided for the photo-taking lens. In the case of the first embodiment, the lens microcomputer 410 performs an action corresponding to an action S2 shown in Table 1, whereby the magnification varying system composed of the lens groups 111 and 114 is caused to be driven according to information on the rotation of the ring member (electronic ring).

A second embodiment of this invention is next described. The block arrangement of the second embodiment is the same as that shown in FIG. 1. The second embodiment uses an interchangeable lens having a ring member. An electronic zoom part is provided on the side of the camera body for a zooming operation including optical zooming and electronic zooming. The second embodiment is thus arranged to perform an action corresponding to the action S2 of Table 1.

Figure 9:
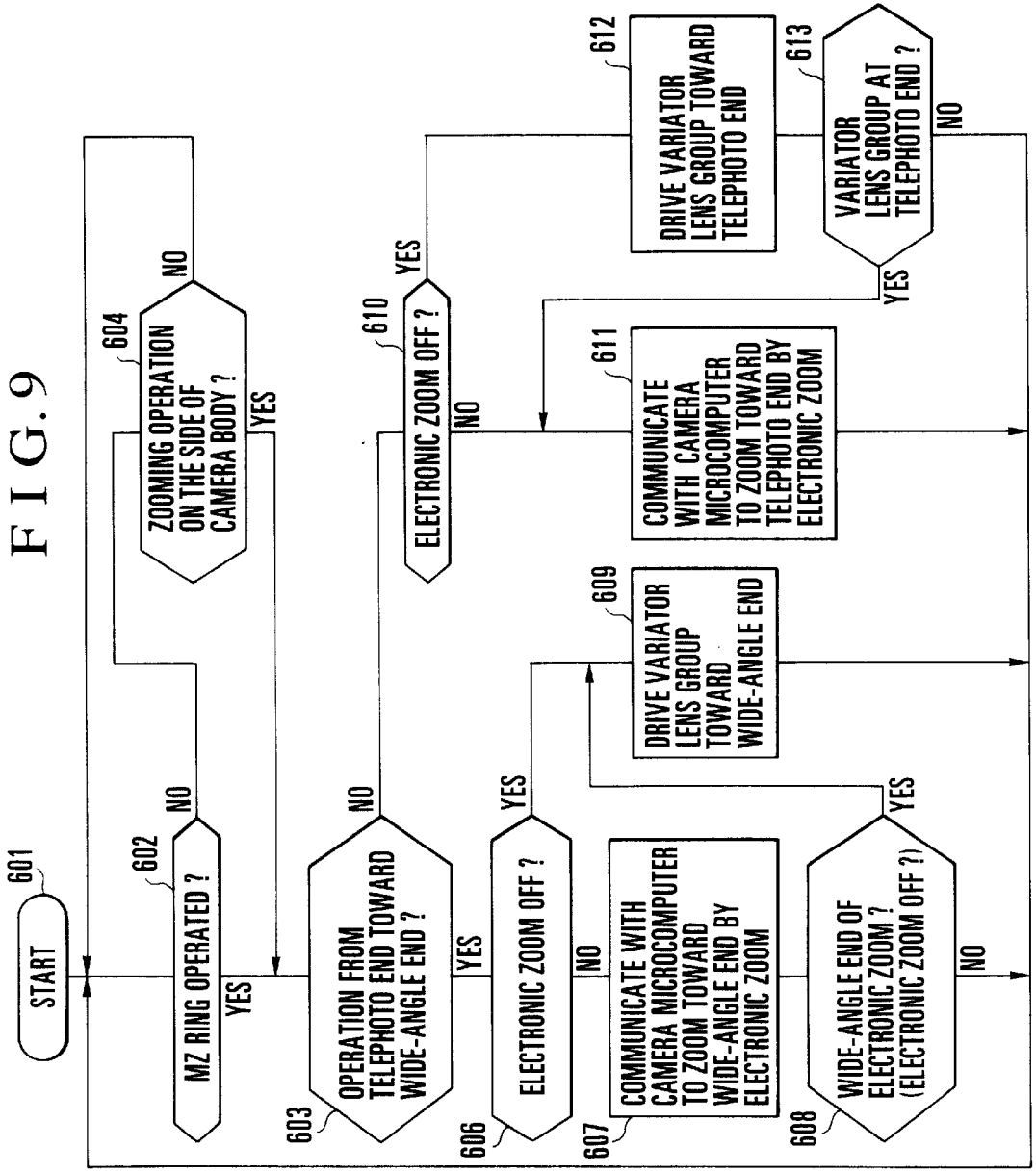
FIG. 9 is a flow chart showing an operation of a second embodiment of this invention.

FIG. 9 is a flow chart showing a zooming action of the lens microcomputer 410 in the second embodiment.

Referring to FIG. 9, the flow starts at a step 601. At a step 602, a check is made to find if the ring member (MZ ring) 506 is rotated by the operator. If not, the flow proceeds to a step 604 to make a check for the state of the zoom operation means 157 disposed on the side of the camera body 419. In this instance, it is necessary to have information on the operating state of the zoom switch 157, i.e., the zoom operation means, on the side of the camera body 419 sent from the camera microcomputer 409 to the lens microcomputer 410 through the contact block. If no zooming operation on the zoom switch 157 is found at the step 604, the flow returns to the start step 601. In a case where both the ring member 506 and the zoom switch 157 of the camera body 419 are operated, the operation on the ring member 506 would have priority in the case of this flow chart. However, this order of precedence is changeable by interchanging the steps 602 and 604.

If a zooming operation is performed either on the side of the lens unit or on the side of the camera body, the flow proceeds to a step 603. At the step 603, a check is made to find if the operation is for zooming from the telephoto end toward the wide-angle end (for a shorter focal length). If so, the flow proceeds to a step 606. If not, i.e., if the zooming is from the wide-angle end toward the telephoto end (for a longer focal length), the flow proceeds to a step 610.

Zooming toward the wide-angle end is first described as follows. At the step 606, a check is made to find if the electronic zoom is in an off-state indicating that the electronic zoom is not applied to the zooming operation. In other words, the image cutting which corresponds to the so-called trimming is not performed. When the electronic zoom is in an on-state, it indicates that the image is magnified by electronic zooming and the image cutting is made accordingly.

If the electronic zoom is found at the step 606 to be not in the off-state, the flow proceeds to a step 607. At the step 607, the camera microcomputer 409 is instructed through the contact block to lessen the magnifying rate by the electronic zoom in accordance with an operation performed by the operator. At the next step 608, a check is made to find if the magnifying rate of the electronic zoom has been lessened to a point X1 where the electronic zoom turns off. If not, the flow returns to the start. Then, if the zooming operation continues, the same route of steps is repeated to continue the magnification varying action by the electronic zoom.

If the electronic zoom is found to be in an on-state at the step 608, the flow proceeds to a step 609. At the step 609, the optical zoom is performed by moving the second lens group toward the wide-angle end (the second lens group is moved toward the object side in the case of the zoom lens composed of four lens groups) as intended by the operator. In a case where the electronic zoom is found at the step 606 to be already in an off-state, the flow proceeds to the step 609 to perform zooming toward the wide-angle end by the optical zoom.

If the result of the check made at the step 603 is NO, i.e., in the event of an instruction for zooming from the wide-angle end toward the telephoto end, the flow proceeds from the step 603 to a step 610. At the step 610, a check is made for the state of the electronic zoom through the communication with the camera microcomputer 409, in the same manner as the step 606. If the electronic zoom is found to be in an on-state, the flow proceeds to a step 611 to cause zooming toward the telephoto end by the electronic zoom. If not, the flow proceeds to a step 612 to vary the magnifying rate by moving the second lens group in the direction of the optical axis by the optical zoom. At a step 613, a check is made to find if the second lens group has reached the telephoto end position of the optical zoom. If so, the optical zoom is changed over to the electronic zoom.

Figure 10A:
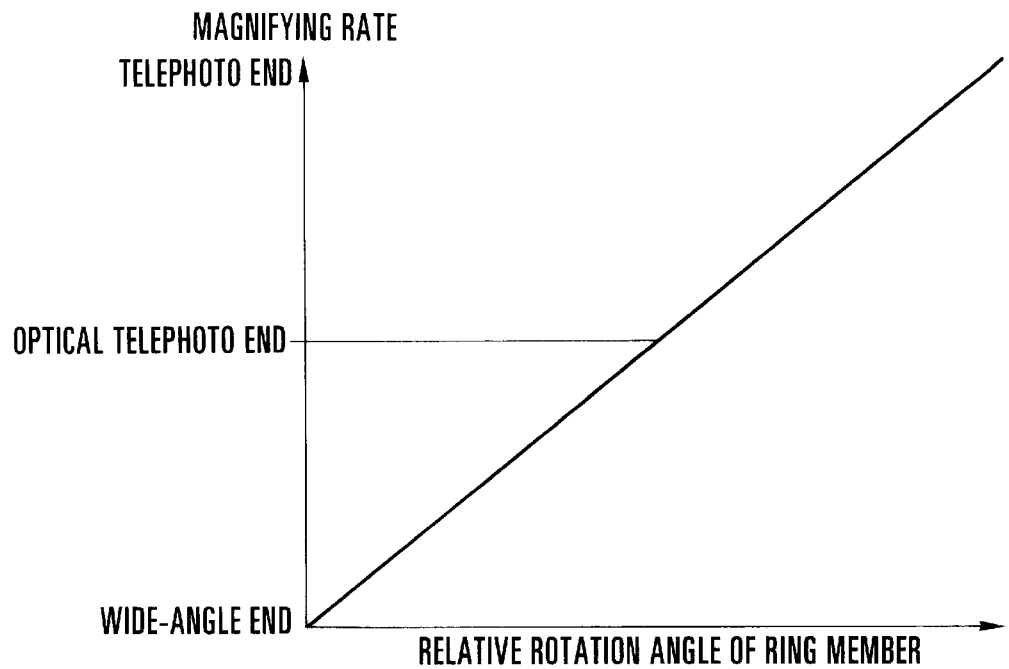
FIGS. 10(A), 10(B) and 10(C) are graphs each showing the magnifying rate in relation to the relative rotation angle of a ring member in the second embodiment.
Figure 10B:
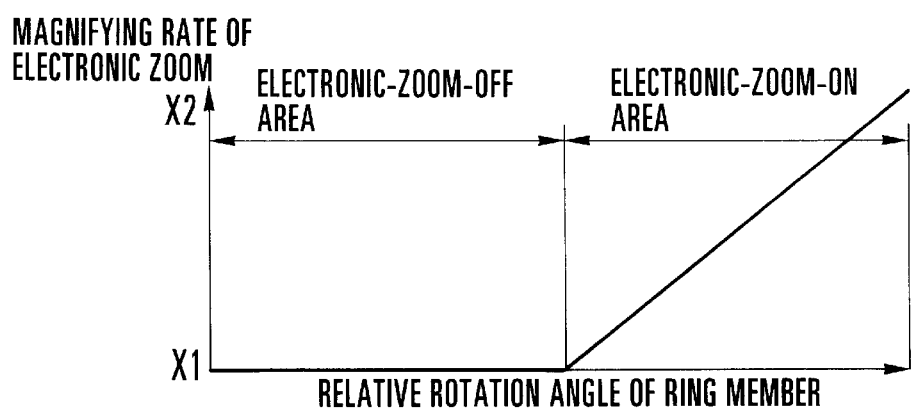
Figure 10C:
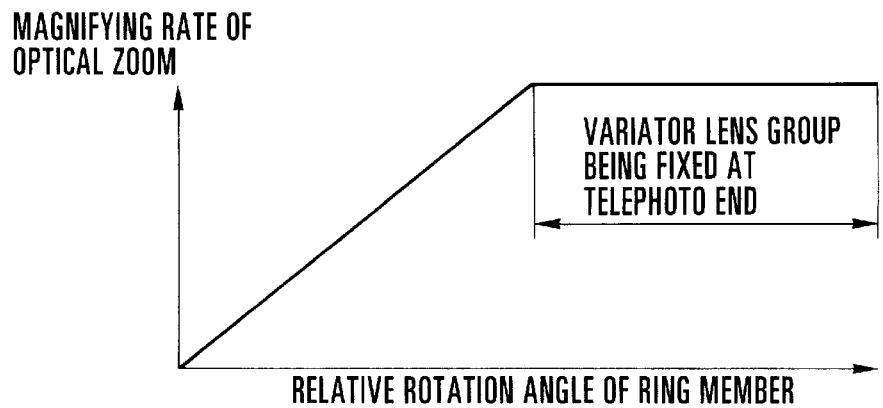

FIGS. 10(A) to 10(C) show in detail the zooming operation to be carried out as described above by the optical zoom and the electronic zoom in combination. FIG. 10(A) shows a total zoom magnification. The details of the total zoom magnification are as shown in FIGS. 10(B) and 10(C). The magnifying rate is first varied by the optical zoom as shown in FIG. 10(C) Then, the high magnifying rate side of the telephoto end of the optical zoom is arranged to be the area of the electronic zoom. This concept is the same as the concept shown in FIGS. 8(A) to 8(C).

The second embodiment is arranged, as described in the foregoing, to perform zooming by giving priority to the electronic zoom when the electronic zoom is in an on-state, i.e., when the zoom magnifying rate is in a range from 12 magnifications to 24 magnifications.

On the other hand, when the electronic zoom is in an off-state, i.e., when the zoom magnifying rate is within a range from 1 to 12 magnifications, for example, zooming is performed by giving priority to the optical zoom, for the purpose of making the quality of output images as good as possible.

Further, the second embodiment may be modified by arranging the camera microcomputer 409 disposed on the side of the camera body 419 to perform the zooming action in place of the lens microcomputer 410 disposed on the side of the photo-taking lens 418. In the case of such a modification, the flow chart of FIG. 9 is changed in part as follows.

While the steps 602 and 604 remain unchanged, the check at the step 602 is changed to be made on the basis of the result of operation sent from the lens microcomputer 410 to the camera microcomputer 409.

The checks at the steps 606 and 610 can be made solely on the side of the camera body 419 and thus require no communication for information.

The steps 607 and 611 are simply executed for zooming toward the wide-angle end without communication.

The check at the step 608 can be made solely on the side of the camera body 419 without communication.

The actions of the steps 609 and 612 are executed through communication through the contact block from the camera microcomputer 409 to the lens microcomputer 410.

The check at the step 613 is made according to the result of communication from the lens microcomputer 410 to the camera microcomputer 409.

A third embodiment of this invention is next described. The third embodiment is arranged to carry out a magnification varying (zooming) action by directly moving the second and fourth lens groups with a mechanical cam part or the like when the operator rotates the ring member 506.

Figure 11:
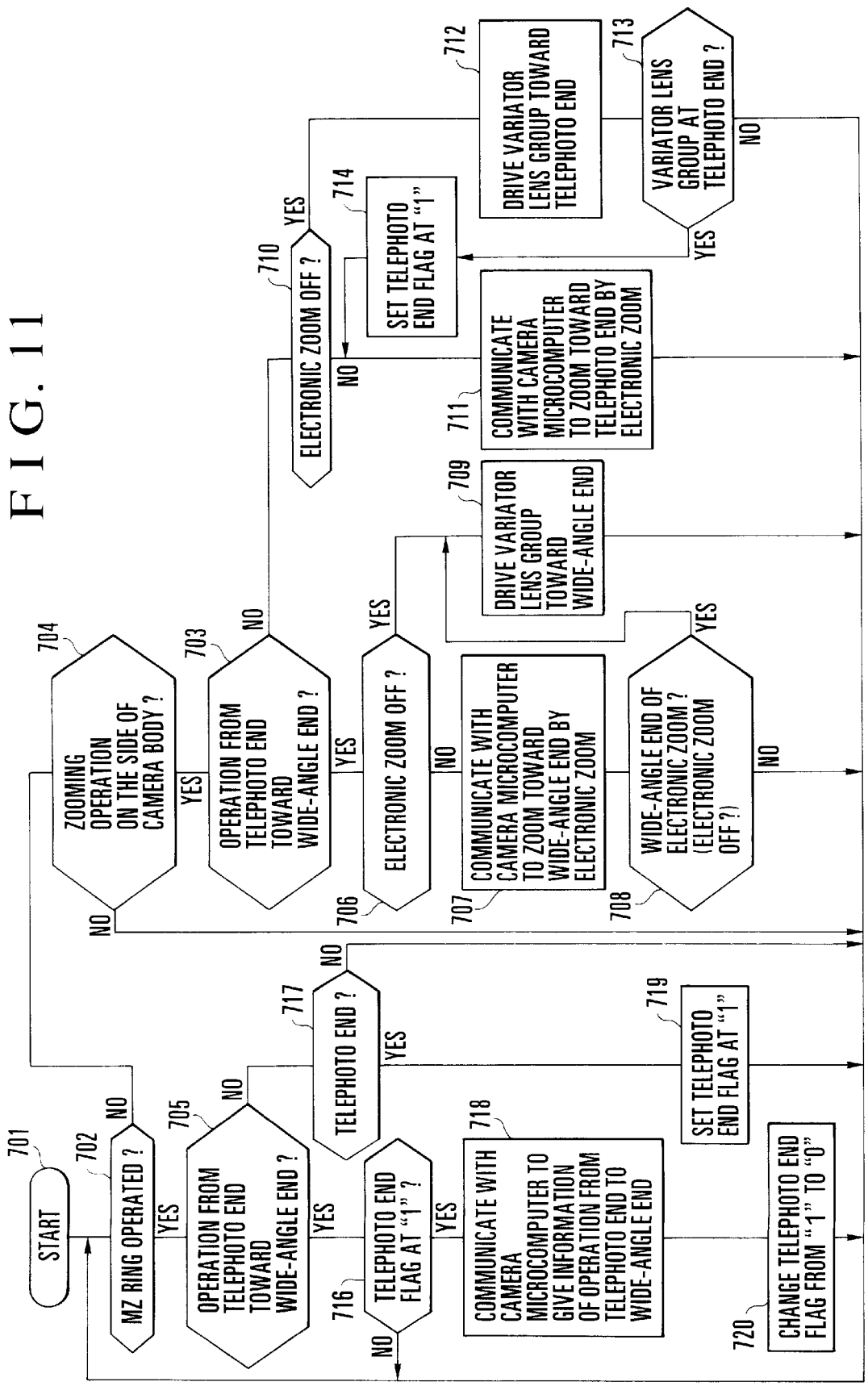
FIG. 11 is a flow chart showing an operation of a third embodiment of this invention.

FIG. 11 is a flow chart showing an operation of the third embodiment, in which the zooming action is to be carried out on the side of the lens microcomputer 410. A telephoto end flag is set at "1" when the variator lens group (the second lens group) reaches its telephoto end position. The flow starts at a step 701. At a step 702, a check is made to find if a zoom operation is performed on the ring member. If not, the flow proceeds to a step 704. At the step 704, a check is made to find if a zoom operation is performed on the side of the camera body. As mentioned in the foregoing description of the second embodiment, the order of precedence between the two zoom operations is changeable. In this case, the photo-taking lens is arranged to permit its variator lens group to be directly movable by operating the ring member.

The steps of this flow chart subsequent to the step 703 are fundamentally the same as the steps subsequent to the step 603 of FIG. 9 which shows the operation of the second embodiment. In other words, the electronic zoom is connected to the telephoto end of the optical zoom to carry out a total zooming action only when the zoom switch on the side of the camera body is operated.

If the ring member is found at the step 702 to be operated (rotated) for zooming, on the other hand, the flow proceeds to a step 705. At the step 705, a check is made for the rotating direction of the zooming operation. If the direction is from a telephoto end position toward a wide-angle end position, the flow proceeds to a step 716 to make a check for the telephoto end flag.

The actual optical zooming is carried out immediately after the rotation of the ring member without recourse to the procedures of this flow of operation. The fact that the rotation and the rotating direction of the ring member are found at the steps 702 and 705 indicates the actual optical zooming. Therefore, if the telephoto end flag is found at the step 716 to be at "1", it indicates that the zooming from the telephoto end toward the wide-angle end has started at the telephoto end.

An end of zooming is detected through an output of the above-stated volume encoder or the like. When the flag is found at the step 716 to be at "1", therefore, the electronic zoom might be in an on-state. At a step 718, the lens microcomputer 410 communicates information to the camera microcomputer 409 indicating that an operation is performed for zooming from the telephoto end toward the wide-angle end. At a step 720, since the zooming position is no longer at the telephoto end, the flag is changed to "0". In the case of zooming from a wide-angle position toward the telephoto end, the flow comes from the step 705 to a step 717. At the step 717, a check is made to find if the variator lens group 112 has reached the telephoto end. If so, the flow proceeds to a step 719 to set the telephoto end flag at "1".

Figure 12:
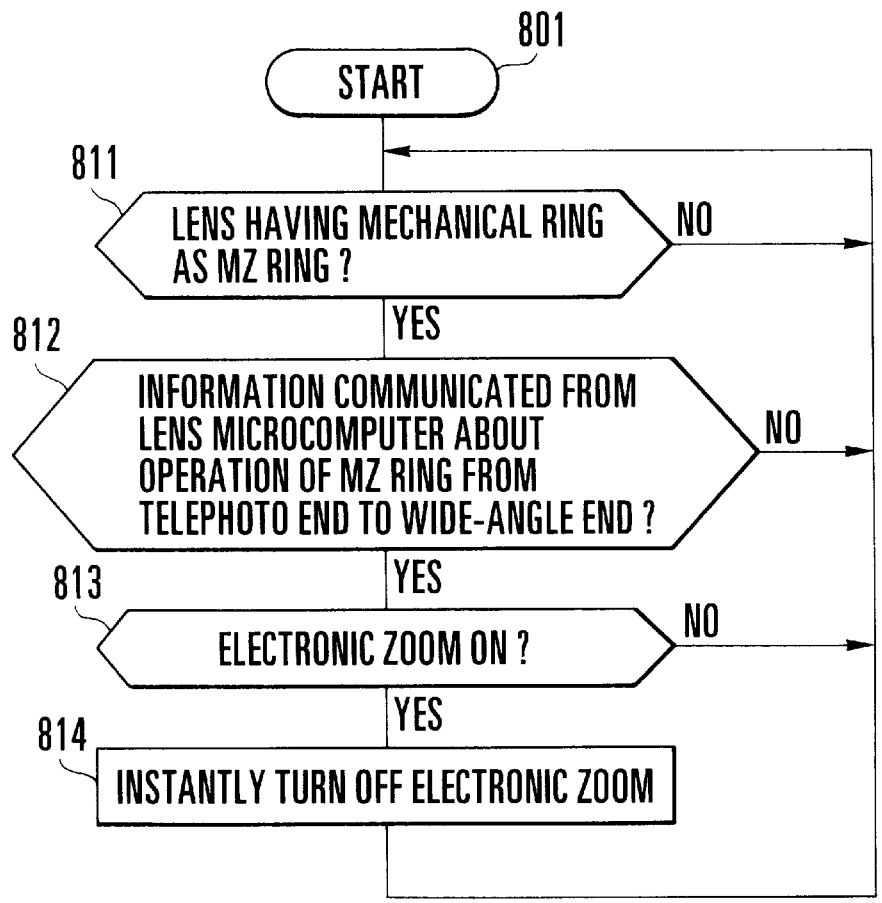
FIG. 12 is a flow chart showing a part of the operation of the third embodiment of this invention.

FIG. 12 is a flow chart showing a flow of an operation to be performed by the camera microcomputer 409 when the lens microcomputer 410 communicates, at the step 718, information to the camera microcomputer 409 to inform the camera microcomputer 409 that the optical zoom operation is performed from the telephoto end toward the wide-angle end.

Referring to FIG. 12, the flow starts at a step 801. At a step 811, a check is made to find whether the photo-taking lens is of a type T1 or a type T2 shown in Table 1. In this case, the photo-taking lens is of the type T2, in which the ring member is mechanically and directly connected to the movement of the variator lens group. The flow then proceeds from the step 811 to a step 812. At the step 812, the communication conducted at the step 718 is checked to find if the ring member has been operated on the side of the lens unit. If so, the flow proceeds to a step 813 to make a check for the state of the electronic zoom provided on the side of the camera body. If a magnification varying action is performed with the electronic zoom left in its on-state, image quality would be left in a deteriorated state. Therefore, in this instance, the flow proceeds to a step 814 to instantly turn off the electronic zoom.

A fourth embodiment of this invention is next described. In the case of the fourth embodiment, actions S3 and S4 shown in Table 1 are carried out by the camera microcomputer 409 on the side of the camera body. The fourth embodiment operates to execute the steps of FIG. 11 subsequent to the step 703 fundamentally in the same manner as the third embodiment, except the following points. The information for which a check is made at the step 713 is obtained through communication. The step 714 is left to be executed by the lens microcomputer 410.

The steps from 702 to 720 of FIG. 11 are to be executed fundamentally by the lens microcomputer 410. As for the operation by the camera microcomputer 409, a check is made at the step 812 shown in FIG. 12, which is inserted in place of the step 702 and is followed by the steps 813 and 814. In other words, the flow of operation is followed by turning the electronic zoom off, to inhibit use of the electronic zoom function, in a case where a zoom operation is performed on the side of the lens unit for zooming from a telephoto position toward the wide-angle end.

Figure 13:
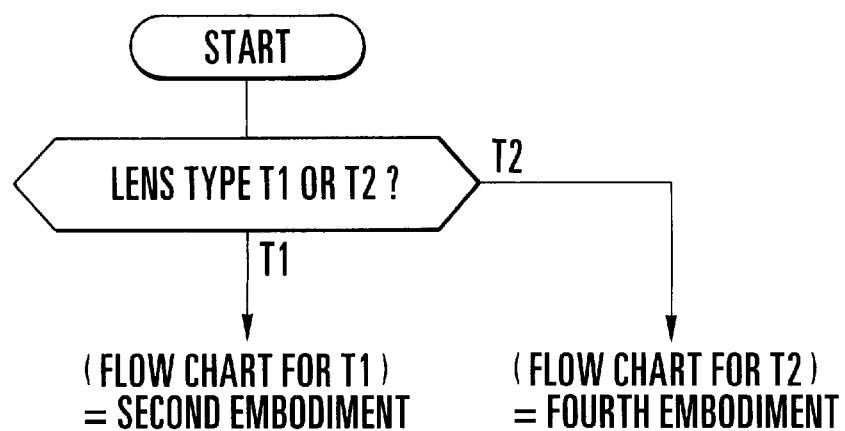
FIG. 13 is a flow chart showing an operation of a fifth embodiment of this invention.

A fifth embodiment of this invention is next described. The modification of the second embodiment and the fourth embodiment described above are both arranged to carry out the zooming action in accordance with the procedures of flow charts stored within the microcomputer disposed on the side of the camera body. In such a case, therefore, a flow chart to be employed varies according to whether the ring member of the photo-taking lens mounted on the camera body is an electronic ring of the type T1 arranged to perform actions S1 and S2 or a mechanical ring of the type T2 performing actions S3 and S4, as shown in Table 1. Therefore, in a case where a zooming action is to be carried out under the control of the camera microcomputer in the above-stated manner, a step of making a discrimination between the lens types (T1 and T2) is inserted to be first executed in the flow of operation as shown in FIG. 13. Either the flow of operation of the second embodiment or that of the fourth embodiment is selected according to the result of the discrimination.

Figure 14:
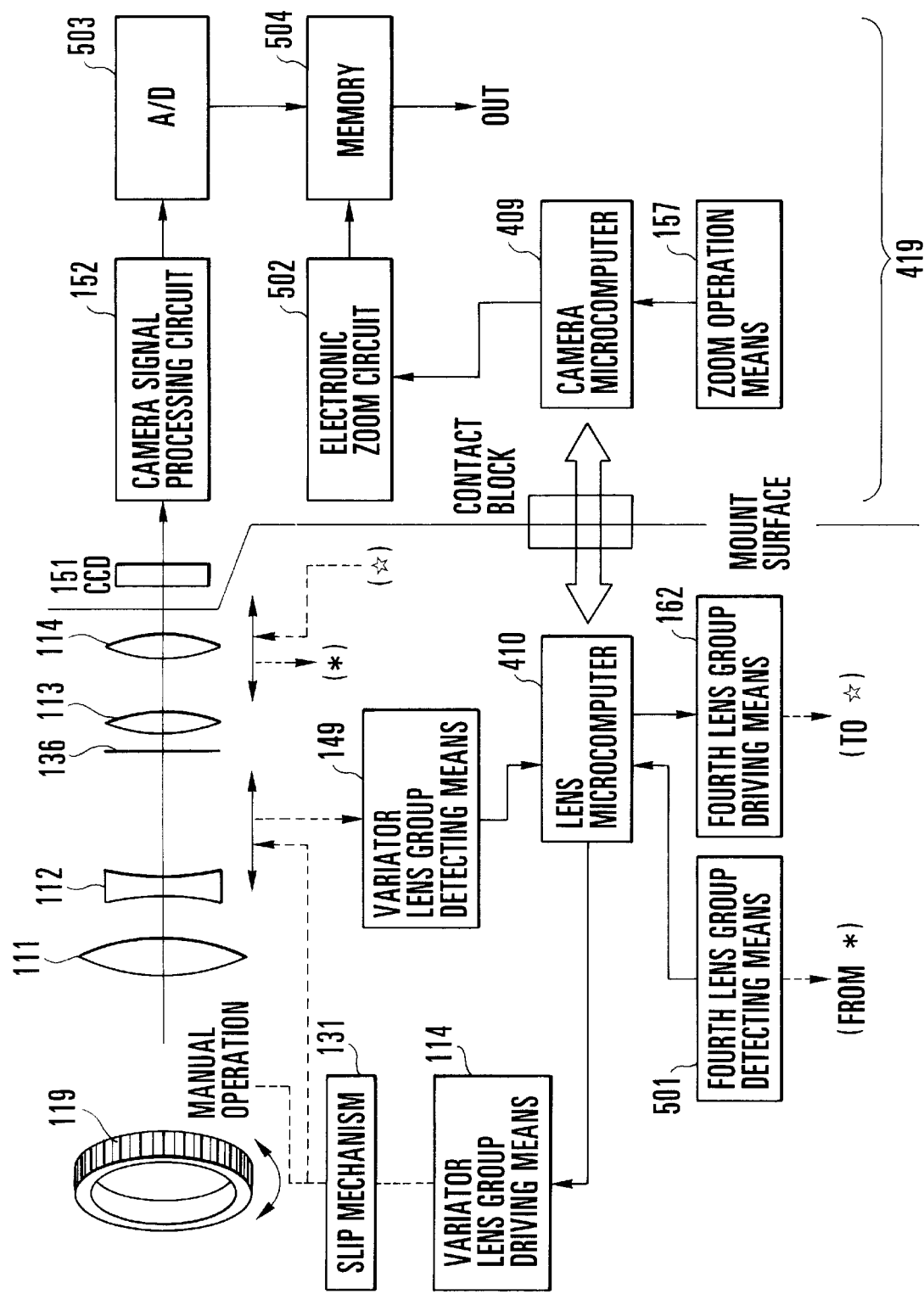
FIG. 14 is a block diagram showing essential parts of the fifth embodiment of this invention.
Figure 15:
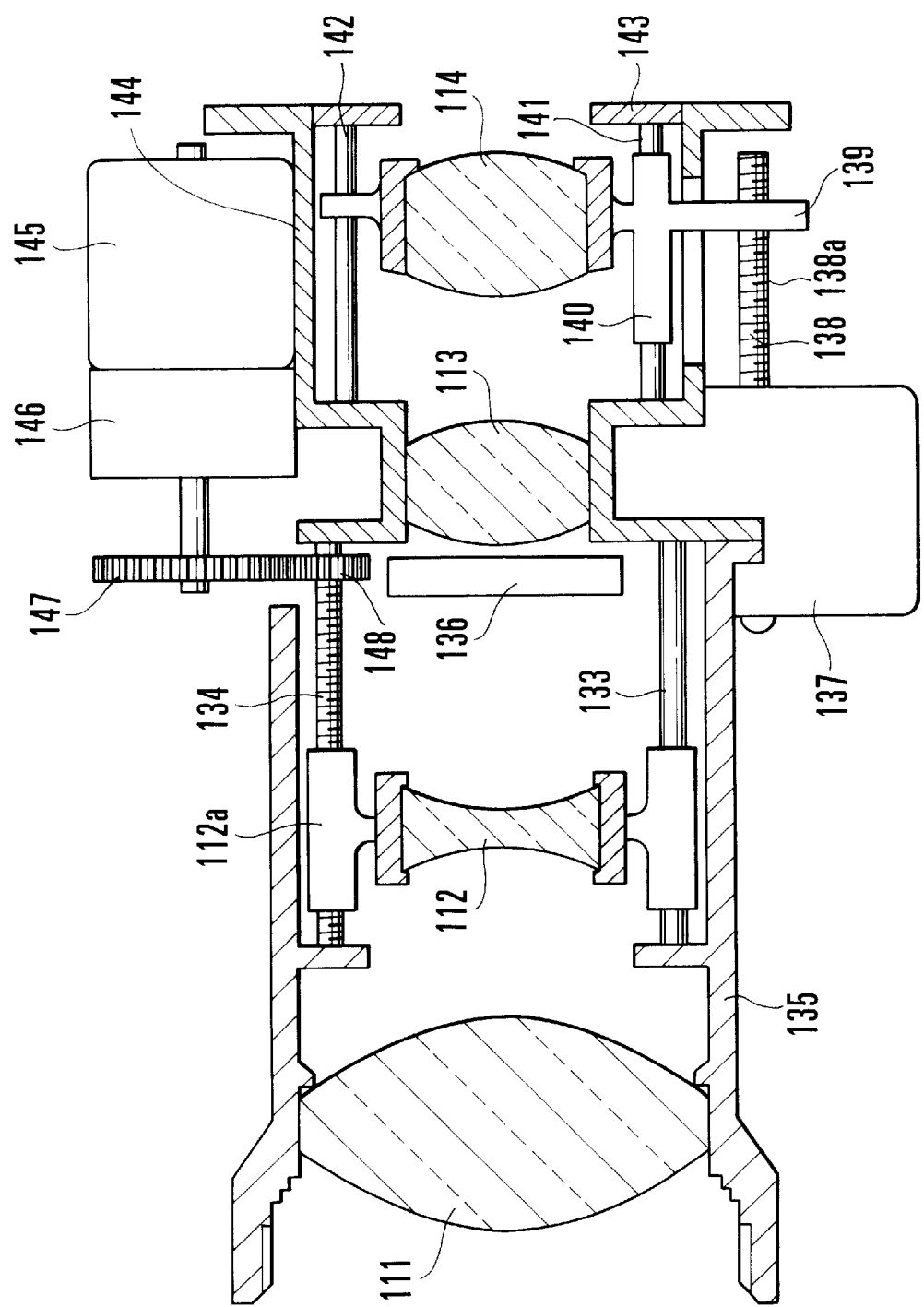
FIG. 15 is a sectional view showing an ordinary conventional zoom lens barrel of the inner focus type.
Figure 16:
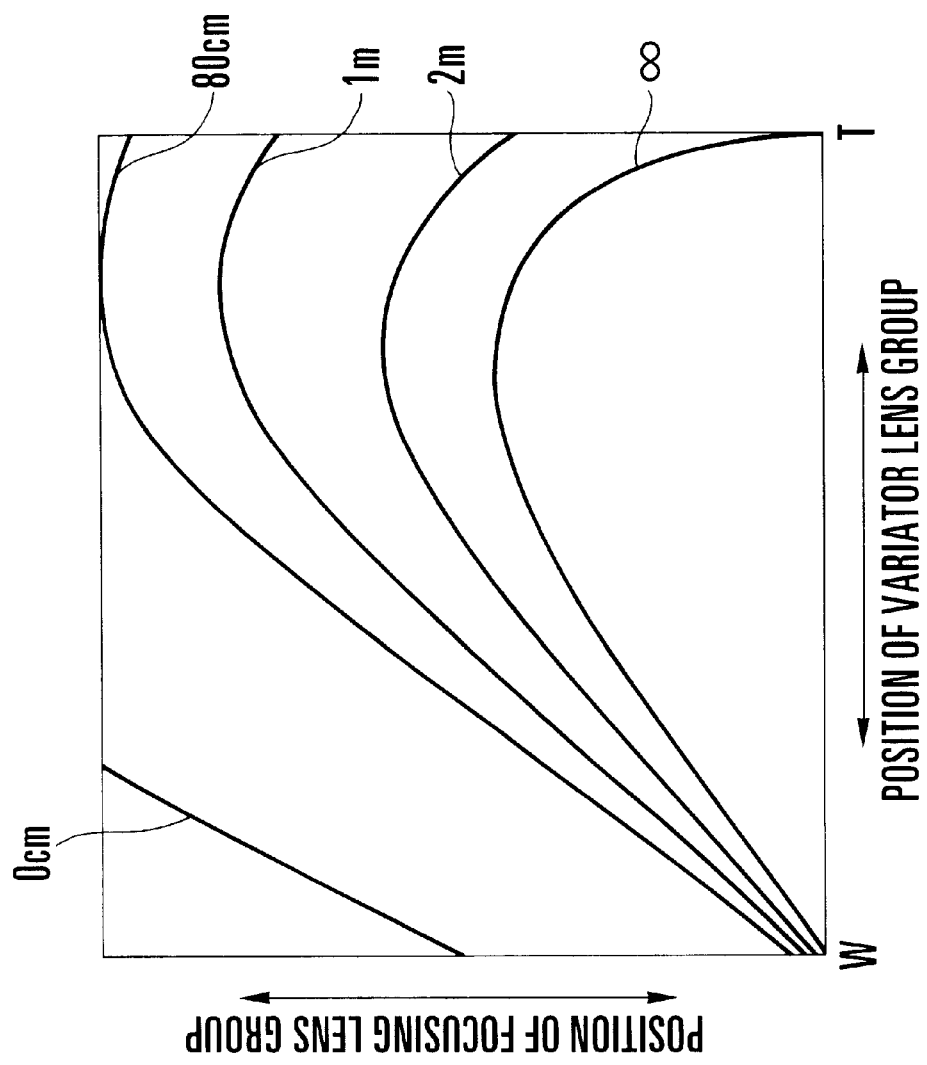
FIG. 16 is a graph showing loci of a positional relations obtained between a variator lens group and a focusing lens group in an inner focus type zoom lens at various object distances.
Figure 17:
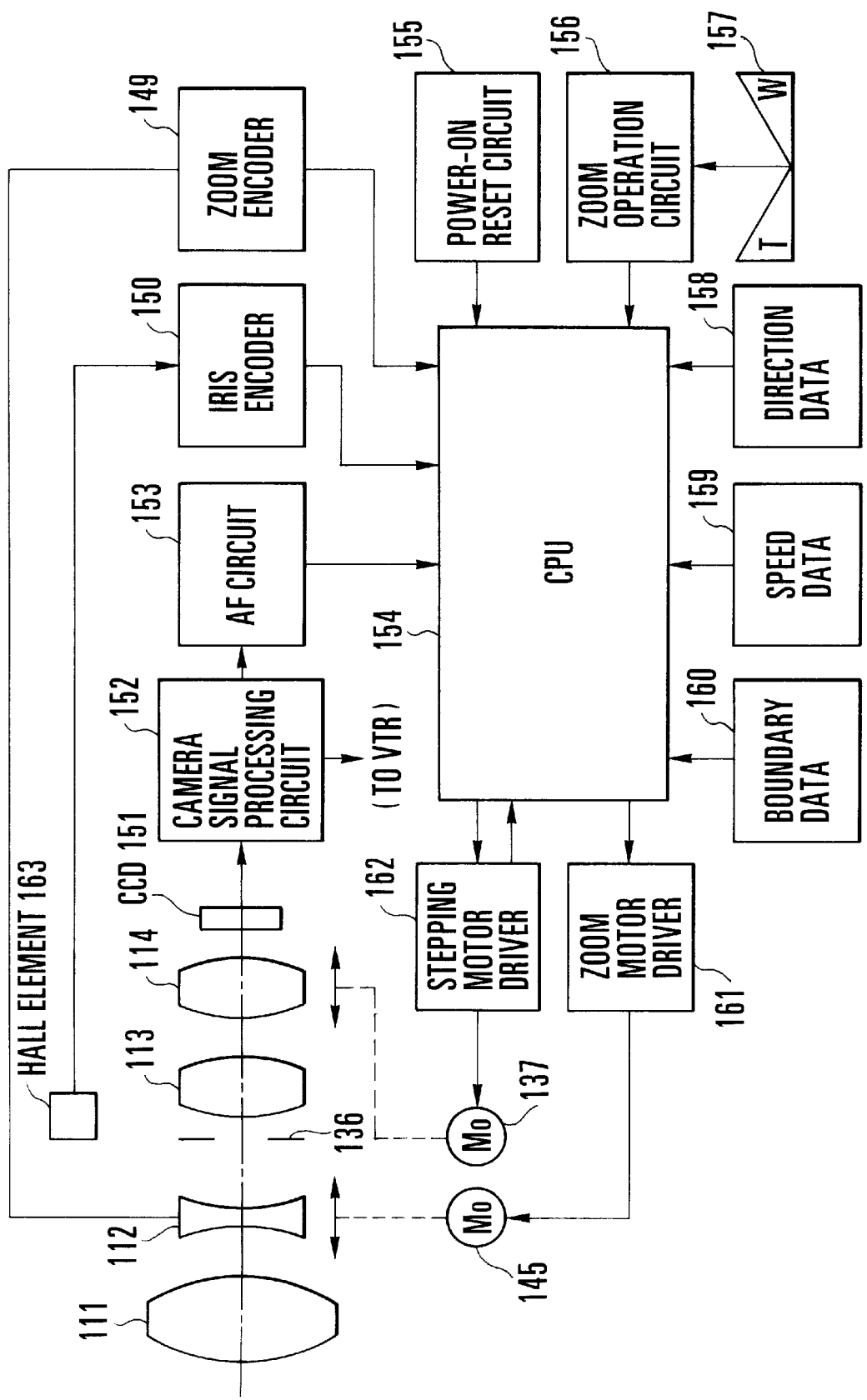
FIG. 17 shows in a block diagram the arrangement of a lens control system of an inner focus type zoom lens.
Figure 18:
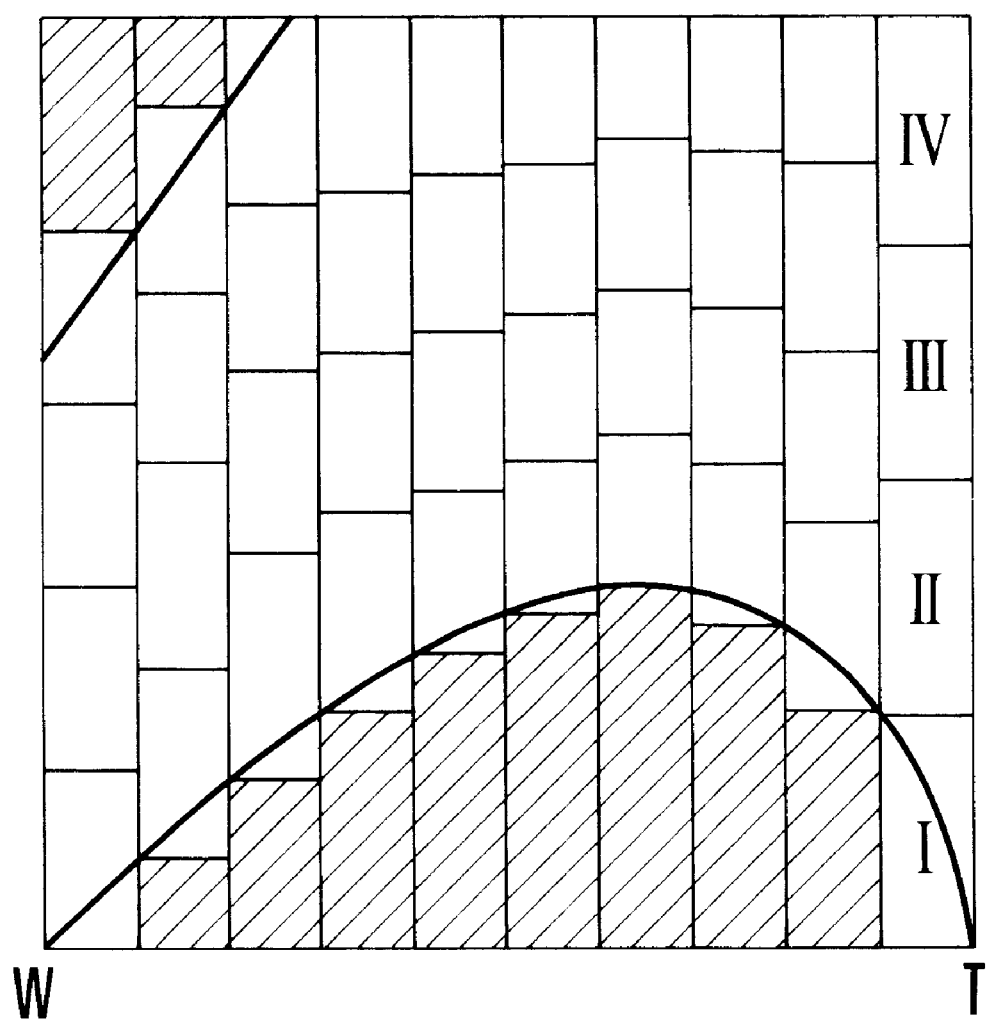
FIG. 18 shows a zoom tracking method of an inner focus type zoom lens.
Figure 19:
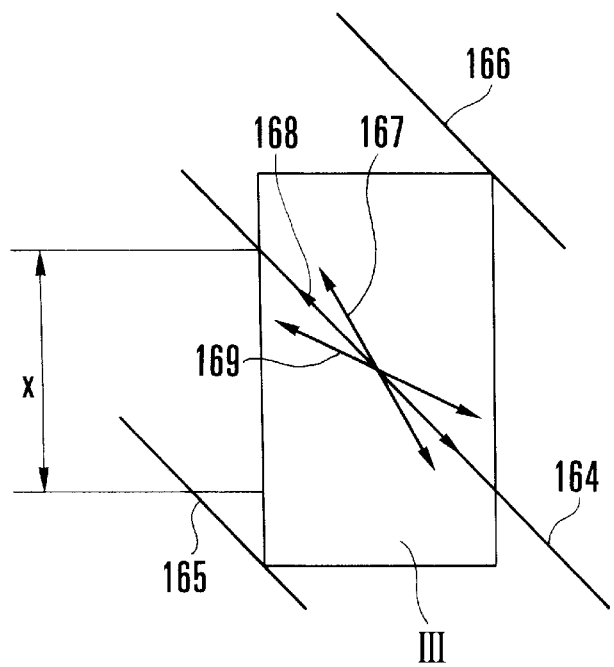
FIG. 19 shows the zoom tracking method of the inner focus type zoom lens.
Figure 20:
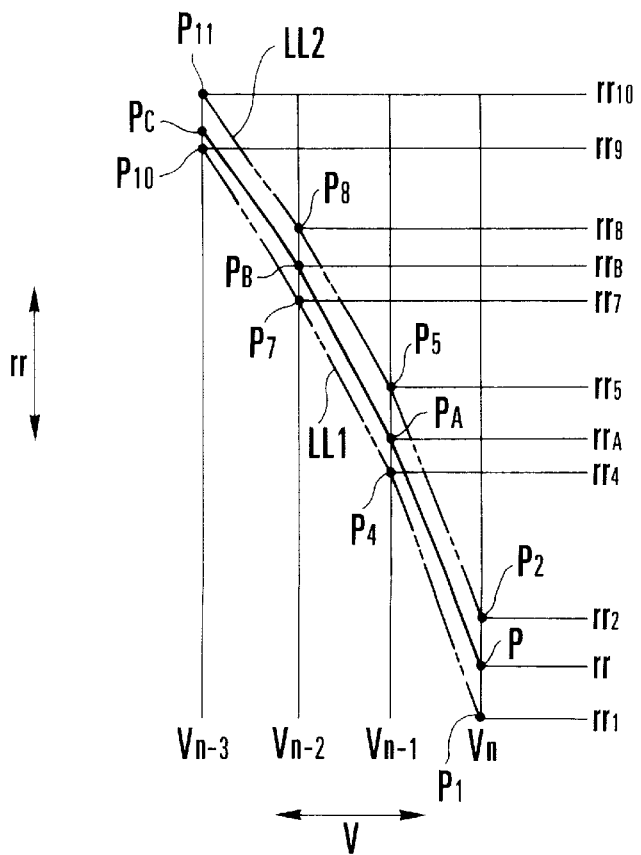
FIG. 20 shows the zoom tracking method of the inner focus type zoom lens.
Figure 21:
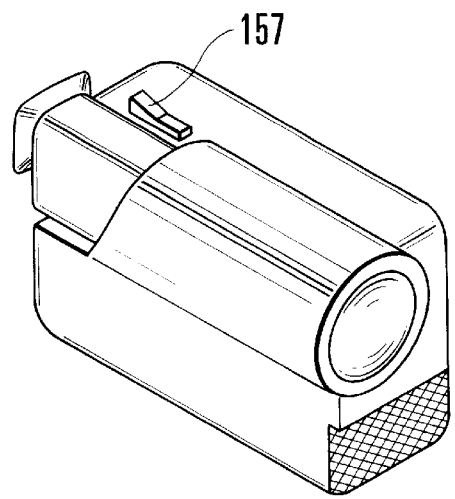
FIG. 21 is a perspective view showing a portion of a video camera where a zoom switch is located in general.
Figure 22:
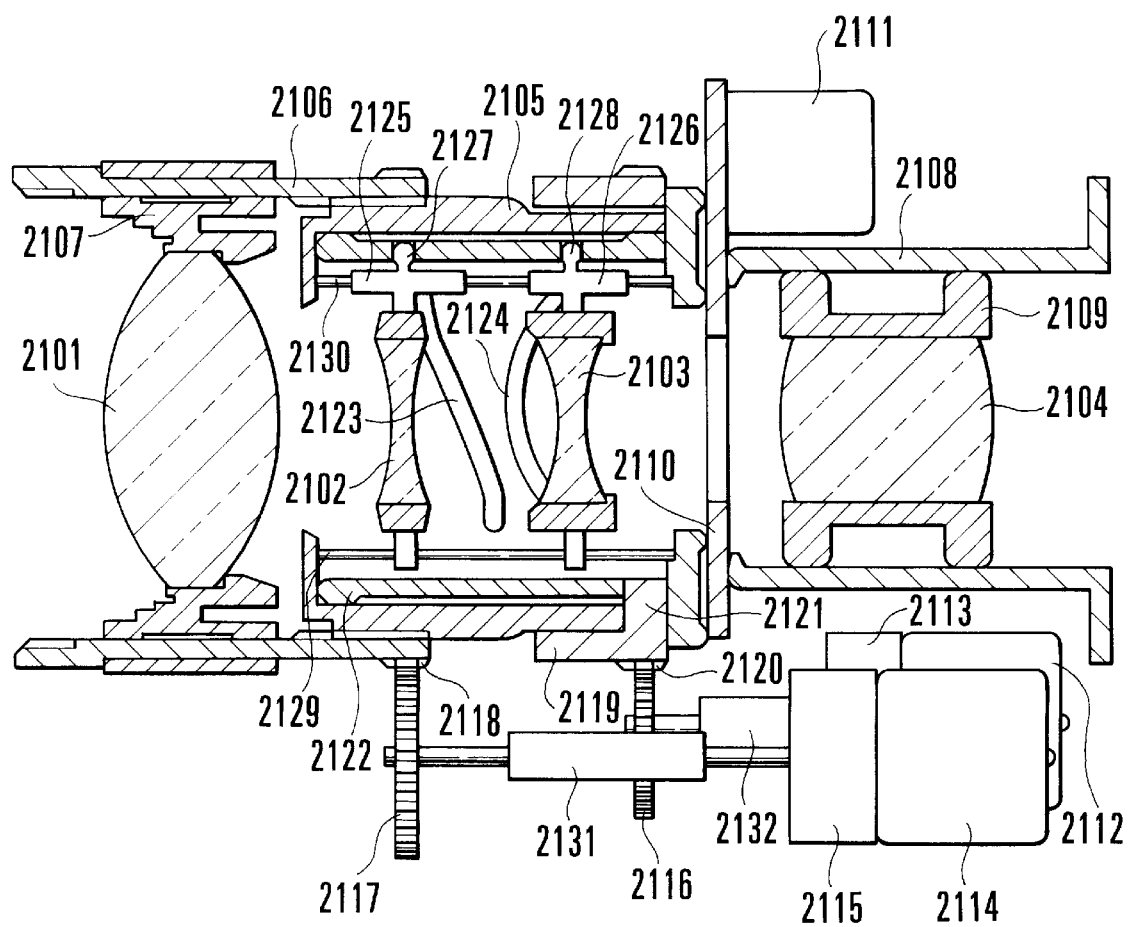
FIG. 22 is a sectional view showing the arrangement of the conventional front-lens focus type zoom lens.
Figure 23A:
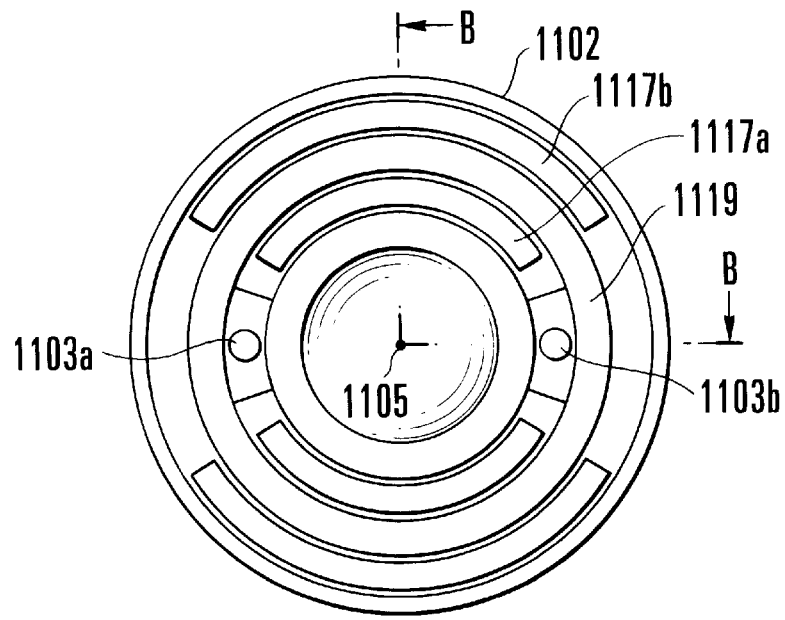
FIGS. 23(A) and 23(B) show the conventional lens moving mechanism using a linear motor.
Figure 23B:
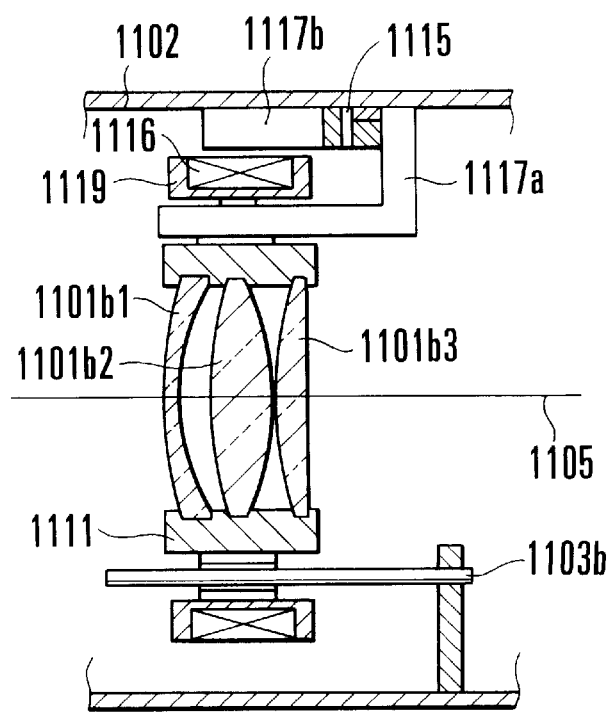
Figure 24:
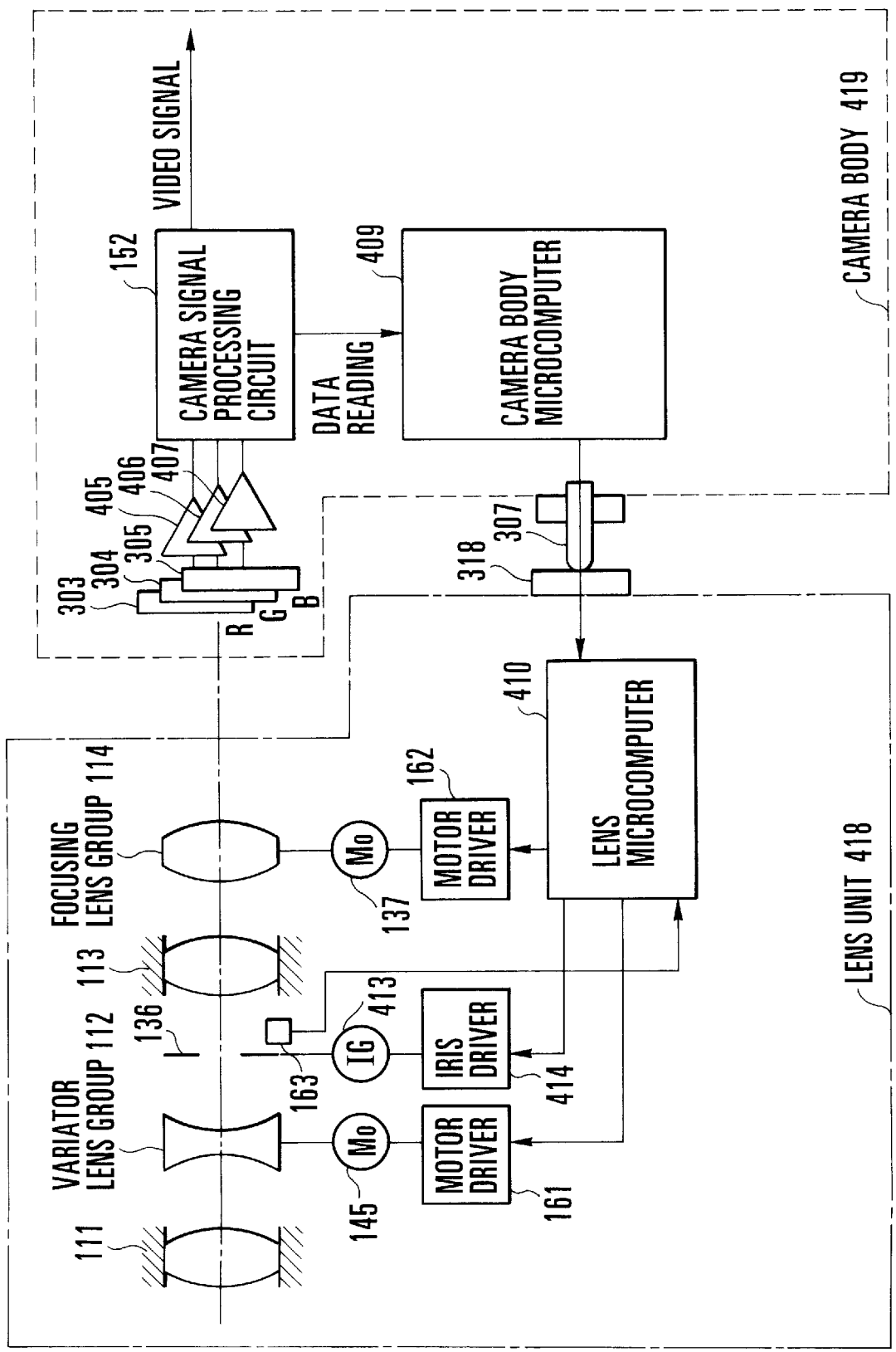
FIG. 24 is a block diagram showing a camera system having a lens unit arranged to be detachably mountable on a camera body.
Figure 25:
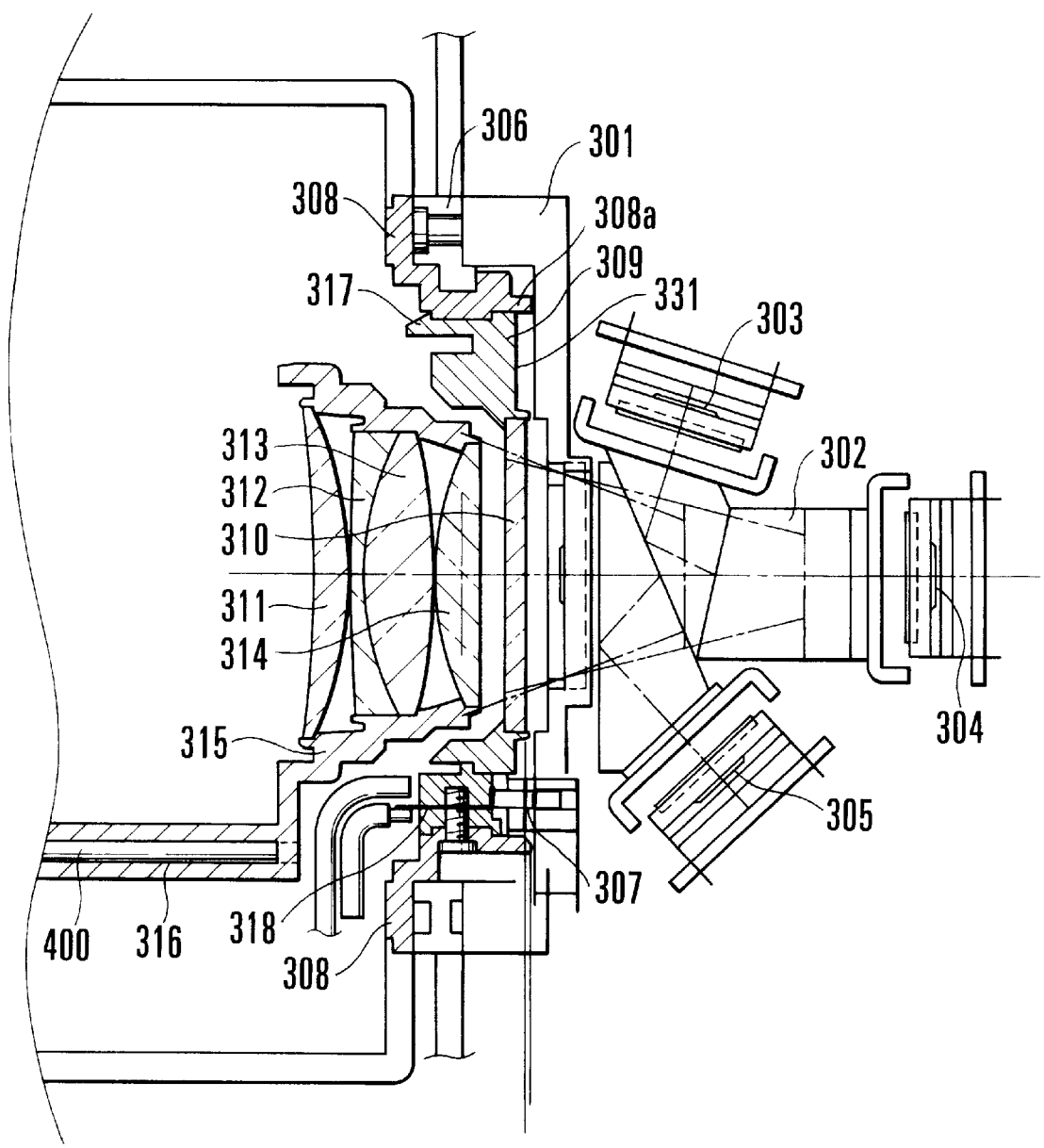
FIG. 25 is a longitudinal section showing a lens barrel mounted on a camera body.
Figure 26:
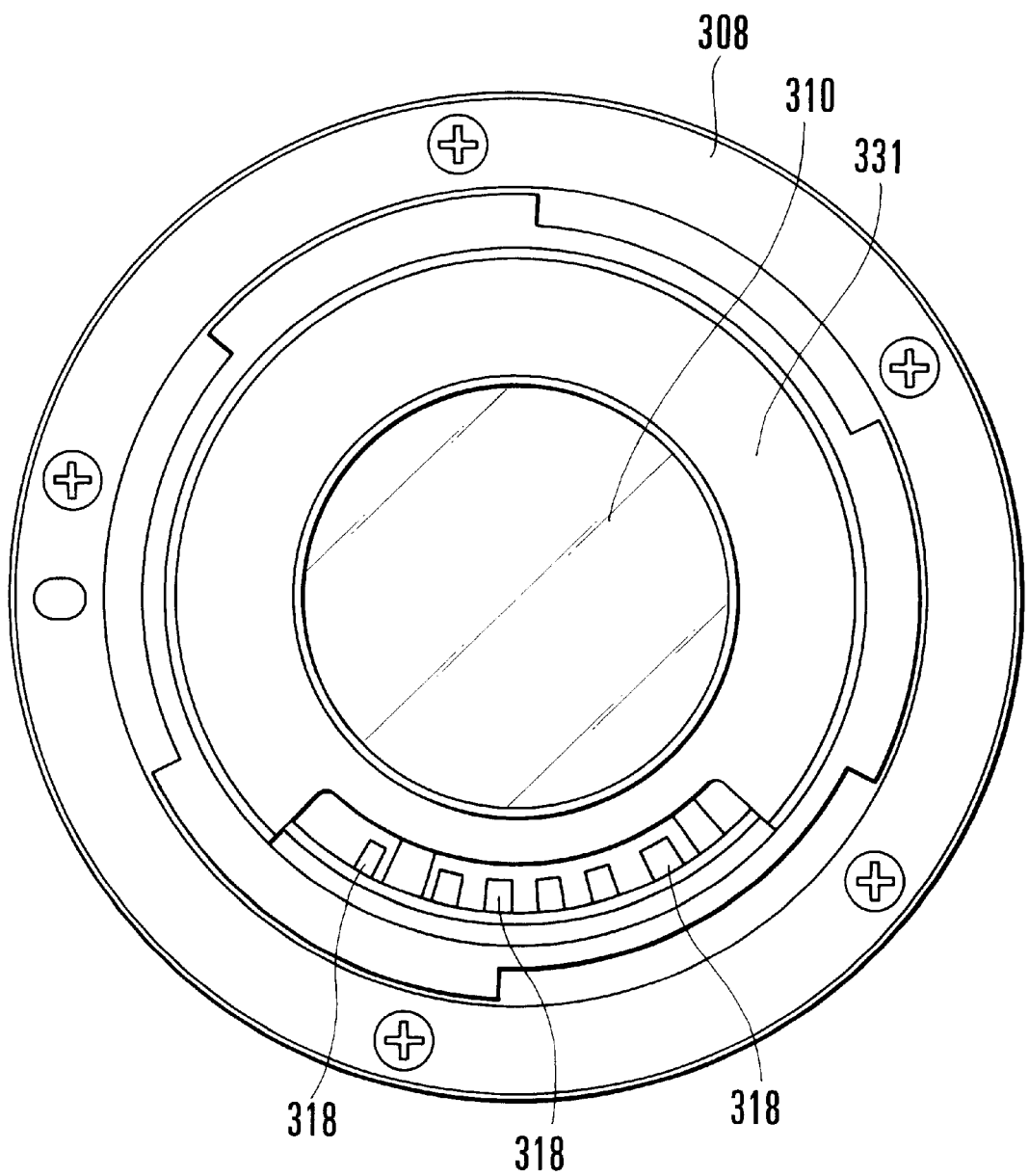
FIG. 26 shows an end face of a lens barrel in a state obtained before mounting it on the camera body.

FIG. 14 is a block diagram which is similar to FIG. 1 and shows an arrangement applicable to a case where the photo-taking lens of the type T2 adapted for the actions S3 and S4 of Table 1 is mounted on the camera body 419. Referring to FIG. 14, the camera body 419 is composed of the same blocks as those of FIG. 1. A difference from the arrangement shown in FIG. 1 lies in that, when a zoom operation ring 119 is operated, the variator lens group 112 moves in the direction of the optical axis in a mechanically interlocked state. The mechanical interlocking mechanism is arranged to be operated, for example, by rotating a cam ring or by some other suitable means. In the case of this lens type, it is only the variator lens group 112 that is interlocked with the cam ring.

TABLE 1

|  | Structure of MZ ring (ring member) | |
|---|---|---|
|  | Electronic ring | Mech. ring |
| Zooming operation: | | |
| Zoom switch on camera side: | S1 | S3 |
| Ring member on lens side: | S2 | S4 |
|  | T1 | T2 |

As described in the foregoing, each of the first to fourth embodiments disclosed above includes a ring member in a part of the photo-taking lens, detecting means arranged to detect the direction and speed of rotation of the ring member, and control means arranged to control a magnification varying action, i.e., zooming, by using a signal obtained from the detecting means. Apposite arrangement of these component parts dispenses with some parts such as a cam ring and gives a photo-taking lens which permits a magnification varying operation to be adequately carried out without any difficulty.

In accordance with this invention, an optical apparatus in which a photo-taking lens having optical zooming means is detachably mounted on a camera body having electronic zoom means can be arranged to give not only a natural feeling of a zooming operation but also images of an excellent quality by adequately controlling driving actions on optical zoom means and electronic zoom means in such a way as to adequately carry out an integral magnification varying (zooming) action.

Further, in a case where an electronic zoom part is disposed on the side of the camera body and a zoom ring member is disposed on the side of the photo-taking lens and where the ring member on the side of the photo-taking lens is to be operated not only mechanically but also electronically, the arrangement according to the invention permits adequate control over a total zooming action. The use of the electronic zoom function can be adequately combined with that of the mechanical zoom function by effectively avoiding such an inopportune combination whereby the electronic zoom function is in an on-state while the mechanical zooming is still in an intermediate point thereof. Further, in a case where an electronic zooming ring member is disposed on the side of an interchangeable photo-taking lens, the interchangeable lens can be arranged according to this invention to permit a zooming operation to be performed either on the side of the photo-taking lens or on the side of the camera body.

I claim:

1. A camera composed of an interchangeable lens and a camera body, comprising:

a) an optical zoom device for moving an optical lens to change an image magnification on an image forming plane;

b) an electric zoom device for changing a range of image to be outputted;

c) a first zoom operation member provided on the interchangeable lens;

d) a second zoom operation member provided on the camera body, and e) a control circuit for causing the optical zoom device and the electric zoom device to continuously operate according to the operation of the first or second zoom operation member.

2. A camera system according to claim 1, wherein said control circuit is a camera micro-computer mounted on the camera body.

3. A camera system according to claim 2, wherein the operation state of the second zoom operation member is transmitted to the camera micro-computer.

4. A camera system according to claim 1, wherein said optical zoom device is controlled by a lens micro-computer mounted on the interchangeable lens.

5. A camera system according to claim 4, wherein said the operation state of the first zoom operating member is transmitted to the camera micro-computer through the lens micro-computer.

6. A camera system according to claim 1, wherein said electrical zoom device is controlled by a camera micro-computer mounted on the camera body.

7. A camera system according to claim 1, wherein said control circuit causes the optical zoom device to move the optical lens to a telephoto end and thereafter causes the electrical zoom device to start a zooming-in operation.

8. A camera system according to claim 1, wherein said control circuit causes the electrical zoom device to start the zooming operation in such a manner that the zooming operation by the optical zoom device overlaps with the zooming operation by the electrical zoom device.

9. A camera system according to claim 1, wherein said rotary manual ring rotates in an endless manner around the optical axis of the optical lens.

10. A camera body attachable with an interchange lens having an optical zoom device which varies image magnification on an image plane, by moving an optical lens, and a first zoom operation member comprising:

a) an electric zoom device which varies an image range to be outputted;

b) a second zoom operation member; and c) a control circuit which causes said optical zoom device and said electric zoom device to continuously operate.

11. An interchange lens attachable to a camera body having an electric zoom device which varies an image range to be outputted, comprising:

a) an optical zoom device which varies an image magnification on an image plane by moving an optical lens;

b) a zoom operation member which, when operated, causes said optical zoom device and an electrical zoom device provided on the camera body to continuously operate.

12. A camera, comprising:

a) an optical zoom device which varies an image magnification on an image plane by moving an optical lens;

b) an electric zoom device which varies an image range to be outputted;

c) a first zoom operation member;

d) a second zoom operation member; and e) a control circuit which causes said optical zoom device and said electric zoom device to continuously operate according to an operation of said first zoom operation member or said second zoom operation member.

13. A camera according to claim 12, wherein said optical zoom device is located in a lens portion.

14. A camera according to claim 12, wherein either of said first zoom operation member and said second zoom operation member is located in a lens operation.

* * * * *

UNITED STATES PATENT AND TRADEMARK OFFICE
CERTIFICATE OF CORRECTION

PATENT NO. : 5,973,857
DATED : October 26, 1999
INVENTOR(S) : Naoya Kaneda

It is certified that error appears in the above-identified patent and that said Letters Patent are hereby corrected as shown below:

Col. 3, line 5, delete "number" and insert --zones--.
Col. 7, line 31, after "of" delete "positive, positive, positive" and insert
  --positive, negative, positive--.
Col. 16, line 66, after "(C) insert --.--

Signed and Sealed this

Tenth Day of April, 2001

Attest:

NICHOLAS P. GODICI

Attesting Officer        Acting Director of the United States Patent and Trademark Office